US012701307B1

(12) United States Patent
Xu et al.

(10) Patent No.: US 12,701,307 B1
(45) Date of Patent: Aug. 4, 2026

(54) IMAGING SYSTEM

(71) Applicant: SimpliSafe, Inc., Boston, MA (US)

(72) Inventors: Monica Xu, Cambridge, MA (US);
Jordan Thayer, Hopkinton, MA (US);
Rodrigo Vasquez, Medford, MA (US)

(73) Assignee: SimpliSafe, Inc., Boston, MA (US)

( * ) Notice: Subject to any disclaimer, the term of this
patent is extended or adjusted under 35
U.S.C. 154(b) by 0 days.

(21) Appl. No.: 19/320,265

(22) Filed: Sep. 5, 2025

Related U.S. Application Data

(60) Provisional application No. 63/838,008, filed on Jul.
3, 2025.

(51) Int. Cl.
| | |
|---|---|
| *H04N 23/11* | (2023.01) |
| *H04N 7/18* | (2006.01) |
| *H04N 23/56* | (2023.01) |
| *H04N 23/667* | (2023.01) |
| *H04N 23/74* | (2023.01) |

(52) U.S. Cl.
CPC ............. *H04N 23/11* (2023.01); *H04N 7/183*
(2013.01); *H04N 7/188* (2013.01); *H04N*
*23/56* (2023.01); *H04N 23/667* (2023.01);
*H04N 23/74* (2023.01)

(58) Field of Classification Search
CPC ...... H04N 23/11; H04N 23/667; H04N 23/74;
H04N 23/56; H04N 7/183; H04N 7/188
See application file for complete search history.

(56) References Cited

U.S. PATENT DOCUMENTS

| | | | |
|---|---|---|---|
| 11,748,991 B1* | 9/2023 | Day | B60Q 3/85 |
| | | | 348/143 |
| 12,100,215 B1* | 9/2024 | Day | H04N 23/60 |
| 12,418,724 B2* | 9/2025 | Lawrence | G06T 5/50 |
| 12,450,856 B2 | 10/2025 | Klemm et al. | |
| 2008/0077882 A1 | 3/2008 | Kramer et al. | |
| 2012/0140080 A1 | 6/2012 | Taylor et al. | |
| 2014/0125813 A1 | 5/2014 | Holz | |
| 2019/0384900 A1* | 12/2019 | Kosugi | G06V 10/143 |
| 2020/0294401 A1 | 9/2020 | Kerecsen | |

OTHER PUBLICATIONS

U.S. Appl. No. 19/320,271, filed Sep. 5, 2025.
U.S. Appl. No. 19/336,728, filed Sep. 23, 2025.

* cited by examiner

*Primary Examiner* — Jae N Noh
(74) *Attorney, Agent, or Firm* — Secant IP, P.L.L.C.

(57) ABSTRACT

In one example, a method includes turning off one or more
infrared light emitters of a device, illuminating a scene with
a light source of the device other than the one or more
infrared light emitters, the light source simultaneously emit-
ting light in both visible and infrared regions of the elec-
tromagnetic spectrum, and acquiring, with an infrared image
sensor of the device, an image of the scene in response to
detection, by the infrared image sensor, of light from the
light source reflected by an object in the scene.

20 Claims, 12 Drawing Sheets

FIG. 1

IMAGING SYSTEM

CROSS-REFERENCE TO RELATED APPLICATION

This application claims priority to co-pending U.S. Provisional Application No. 63/838,008 filed on Jul. 3, 2025, which is hereby incorporated herein by reference in its entirety.

TECHNICAL FIELD

Aspects of the technologies described herein relate to imaging systems and methods, more particularly, to motion-sensitive cameras and systems and methods utilizing the same.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

Aspects and examples are directed to techniques for acquiring images responsive to illumination from an "out-of-band" light source. For example, an infrared image sensor can be used to acquire images responsive to illumination provided by a visible-band light source, rather than an infrared light source. The out-of-band light source may emit a small portion of light within the sensitivity band of the image sensor, such that the image sensor can acquire images even though the primary emission band of the light source does not match the primary sensitivity band of the image sensor.

According to one example, a method comprises turning off one or more infrared light emitters of a device, illuminating a scene with a light source of the device other than the one or more infrared light emitters, the light source simultaneously emitting light in both visible and infrared regions of the electromagnetic spectrum, and acquiring an image of the scene in response to detection, by an infrared image sensor of the device, of light from the light source reflected by an object in the scene.

According to another example, a method comprises turning off one or more infrared light emitters of a device, illuminating a scene with a light source of the device other than the one or more infrared emitters, the light source emitting light having a range of wavelengths that extends over the visible spectrum into a region of the infrared spectrum adjacent to the visible spectrum, and acquiring an image of the scene in response to detection, by an infrared image sensor of the device, of light from the light source reflected by an object in the scene.

According to another example, a method comprises turning off one or more infrared light emitters of a device, illuminating a scene with a light source of the device, the light source emitting light over a range of wavelengths that includes at least a portion of the visible spectrum and at least a portion of a transition band between the visible spectrum and the infrared spectrum, and acquiring, with an infrared image sensor of the device, an image of the scene in response to detection of light in the transition band emitted by the light source and reflected by an object in the scene.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular aspect, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this disclosure. However, the figures are not intended as a definition of the limits of any particular example. The figures, together with the remainder of this disclosure, serve to explain principles and operations of the described and claimed aspects. In the figures, the same or similar components that are illustrated are represented by a like reference numeral. For purposes of clarity, every component may not be labeled in every figure. In the figures:

FIG. 1 is a schematic diagram of a security system, according to some examples described herein;

DETAILED DESCRIPTION

Figure 2:
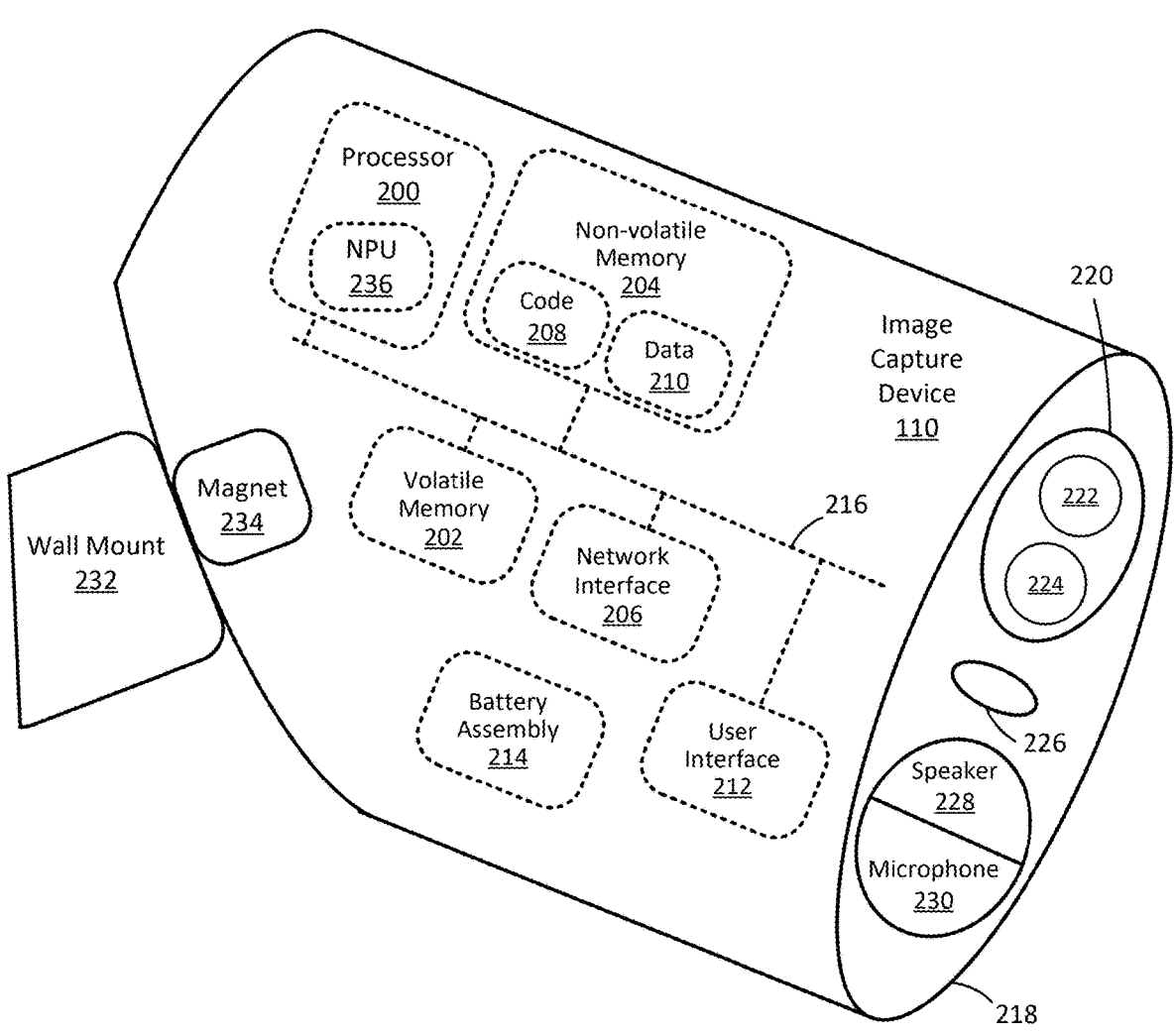
FIG. 2 is a schematic diagram of an image capture device, according to some examples described herein.

Systems (e.g., smart home systems and/or security systems) can include a range of sensors configured to detect various events or conditions, such as motion, moisture, temperature changes, and sounds, among others. For example, imaging sensors can include a camera that captures still and/or video images of a scene within a field of view of the camera. The field of view of the camera corresponds to the extent of the observable world that is "seen" at any given moment by the image capture device, which is generally the solid angle through which the camera is sensitive to electromagnetic radiation. For imaging system that operate during low-light conditions, such as night-time, for example, a light source, such as one or more light emitting diodes (LEDs), positioned near the camera can be used to emit light to make the scene visible. In some examples in which the light source emits in the visible region of the electromagnetic spectrum, the light from the light source can also illuminate the scene for nearby persons.

In some examples, a camera can use active near-infrared (NIR) imaging for night-time or other low-light imaging conditions. In such examples, the light source includes one or more infrared emitters (e.g., infrared emitting diodes) that emit in the NIR region of the electromagnetic spectrum. The camera may include an infrared image sensor that captures images responsive to reflected NIR radiation. NIR imaging may offer advantages for low-light imaging (e.g., night-time imaging) because the infrared image sensor may capture more photons than would a comparable visible-light image sensor, and therefore may produce sharper, higher-contrast images. However, infrared radiation, including NIR radiation, is generally not perceivable or otherwise invisible to the human eye. Accordingly, while illuminating a scene with an NIR emitter may be advantageous for imaging, the non-visible light output by such a device may not be useful for certain other purposes, such as deterring intruders or providing illumination (e.g., of a pathway, entrance area, etc.) for a user. Although a visible-band emitter and infrared emitter may be operated simultaneously to provide both human-perceptible illumination and high-quality NIR imaging, this approach increases the power consumption of the camera. Further, operating multiple emitters simultaneously requires more rigorous thermal management for the camera because the multiple emitters all contribute to heating of the camera.

Accordingly, techniques disclosed herein allow for "out of band" imaging, such as imaging responsive to visible-band illumination using an infrared image sensor, for example. This approach may capture the benefits of both NIR imaging (e.g., sharp, high-contrast images) and visible-band illumination (e.g., illuminating a scene for human perception), while also providing efficient thermal operation and power consumption of the camera. Techniques described herein may provide advantages for any camera that captures images in low light settings (and thus operates in conjunction with an associated light source), including outdoor, indoor, and doorbell cameras, for example.

Examples of the techniques disclosed herein can be implemented in a device, such as a camera system, that includes an infrared image sensor for acquiring images of a scene, along with one or more infrared light emitters and an additional light source (other than the one or more infrared emitters) for illuminating the scene. The image sensor may be part of an image capture device. The light source and the infrared light emitter(s) may be integrated with the image capture device, attached to the image capture device, or separate from the image capture device. In some examples, a method of operating a device may include turning off, or deactivating, one or more infrared light emitter(s) of the device, and illuminating a scene with a light source of the device other than the one or more infrared emitters, wherein the light source emits light having a range of wavelengths that extends across at least a portion of the visible spectrum and the infrared spectrum (e.g., at least a portion of the NIR spectral band). The method may further include acquiring, with an infrared image sensor of the device, an image of the scene in response to detection, by the infrared image sensor, of light from the light source reflected by an object in the scene.

These and other aspects and examples are discussed in more detail below.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example. For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

Figure 1:
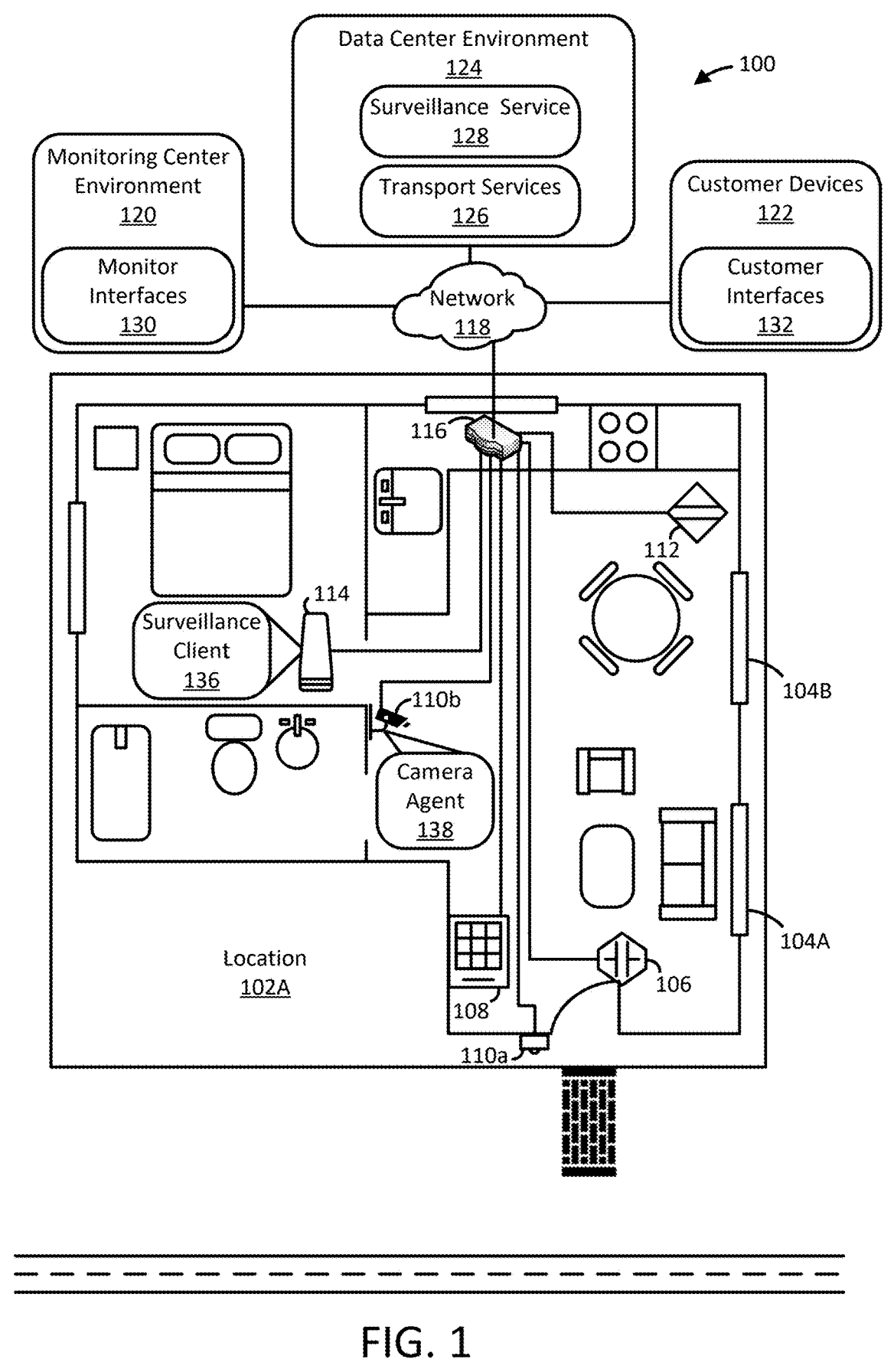

As described above, lighted camera systems (e.g., systems including a camera and a light source that provides primary illumination for at least a portion of the field of view of the camera) can be used in variety of applications, including in security systems, monitoring systems, or smart home systems, for example, and/or other systems in which it is desirable to provide illumination for the camera. FIG. 1 is a schematic diagram of a system 100 configured to monitor geographically disparate locations in accordance with some examples. The system 100 may be a security system or smart home system, for example. As shown in FIG. 1, the system 100 includes various devices disposed at a monitored location 102A, a monitoring center environment 120, a data center environment 124, one or more customer devices 122, and a communication network 118. Each of the monitoring center environment 120, the data center environment 124, the one or more customer devices 122, and the communication network 118 include one or more computing devices (e.g., as described below with reference to FIG. 9). Some or all of the devices disposed at the monitored location 102A may also include one or more computing devices. The one or more customer devices 122 are configured to host one or more customer interface applications 132. The monitoring center environment 120 is configured to host one or more monitor interface applications 130. The data center environment 124 is configured to host a surveillance service 128 and one or more transport services 126. In some examples, devices at the monitored location 102A include one or more image capture devices 110 (individually identified as image capture devices 110a and 110b in FIG. 1), a contact sensor assembly 106, a keypad 108, a motion sensor assembly 112, a base station 114, and a router 116. The base station 114 hosts a surveillance client 136. The image capture device 110 hosts a camera agent 138. The devices disposed at the monitored location 102A (e.g., devices 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the monitored location 102A by way of example only. Other networking technology that involves other computing devices is suitable for use within the location 102A. For instance, in some examples, the base station 114 can receive and forward communication packets transmitted by the image capture device 110 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, etc.). Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the monitored location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the monitored location 102A support other communication protocols, such as MQTT or other IoT protocols.

The data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

In some examples, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 106, 110, and 112 are configured to acquire analog signals via sensors incorporated into the devices, generate digital sensor data based on the acquired signals, and communicate (e.g. via a wireless link with the router 116) the sensor data to the base station 114. The type of sensor data generated and communicated by these devices varies along with the type of sensors included in the devices. For instance, the image capture devices 110 can acquire ambient light, generate frames of image data responsive to the acquired light, and communicate the frames to the base station 114, the monitor interfaces 130, and/or the customer interfaces 132, although the pixel resolution and frame rate may vary depending on the capabilities of the devices. Where the image capture devices 110 have sufficient processing capacity and available power, the image capture devices 110 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 100 (e.g., via the router 116). In some examples, the image capture device(s) 100 may transmit images and/or metadata associated with the images to one or more remote devices.

As shown in FIG. 1, the image capture device 100a has a field of view (FOV) that originates proximal to a front door of the location 102A and can acquire images of a walkway, highway, and a space between the location 102A and the highway. The image capture device 110b has an FOV that originates proximal to a bathroom of the location 102A and can acquire images of a living room and dining area of the location 102A. The image capture device 110b can further acquire images of outdoor areas beyond the location 102A through windows 104A and 104B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 212 of FIG. 2). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate, to the base station 114, sensor data indicating whether the front door of the location 102A is open or closed. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alarm state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of sensor data indicating changes in temperature rather than changes in reflected sound waves. In some examples, the motion sensor assembly 112 may detect motion by monitoring radio frequency signal patterns (e.g., using WI-FI or radar-based sensing). In other examples, the motion sensor assembly 112 may detect motion using infrared or other optical-based sensing.

In some examples, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This aspect can prevent a "crash and smash" robbery from being successfully executed.

In some examples, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alarm condition generated by one or more of the location-based devices. Alternatively or additionally, in some examples, the monitor interface 130 controls its host device to interact with a user to configure aspects of the system 100. It should be noted that, in at least some examples, the monitor interfaces 130 are browser-based applications served to the monitoring center environment 120 by webservers included within the data center environment 124. These webservers may be part of the surveillance service 128, in certain examples.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alarm condition generated by one or more of the location-based devices. Alternatively or additionally, in some examples, the customer interface 132 is configured to process input received from the customer to activate or deactivate one or more of the location-based devices. Further still, in some examples, the customer interface 132 configures aspects of the system 100 in response to input from a user.

Turning to FIG. 2, an example of an image capture device 110 is schematically illustrated. As shown in FIG. 2, the image capture device 110 includes at least one processor 200, volatile memory 202, non-volatile memory 204, at least one network interface 206, a user interface 212, a battery assembly 214, and an interconnection mechanism 216. The non-volatile memory 204 stores executable code 208 and includes a data store 210. In certain examples illustrated by FIG. 2, the components of the image capture device 110 enumerated above are incorporated within, or are a part of, a housing 218. Accordingly, the above-mentioned components of the image capture device 110 are illustrated in dashed lines to indicate that they reside within the housing 218. The various components of the image capture device 110 can communicate with one another via the interconnection mechanism 216. In some examples, the interconnection mechanism 216 includes a communications bus.

In some examples, the processor 200 can include one or more programmable processors to execute one or more executable instructions, such as a computer program specified by the code 208, to control the operations of the image capture device 110. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

In some examples, the non-volatile (non-transitory) memory 204 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory 204 can include an operating system and one or more applications or programs that are configured to execute under the operating system. Alternatively or additionally, the code 208 can include specialized firmware and embedded software that is executable without dependence upon a commercially available operating system.

In some examples, prior to execution of the code 208 the processor 200 can copy the code 208 from the non-volatile memory 204 to the volatile memory 202. In some examples, the volatile memory 202 includes one or more static or dynamic random access memory (RAM) chips and/or cache memory (e.g. memory disposed on a silicon die of the processor 200). Volatile memory 202 can offer a faster response time than a main memory, such as the non-volatile memory 204.

Continuing with the example of FIG. 2, through execution of the code 308, the processor 300 can control operation of the network interface 206. In some examples, the network interface 206 includes one or more physical interfaces (e.g., a radio (including an antenna), an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 206 enables the image capture device 110 to access and communicate with other computing devices (e.g., the other location-based devices) via a computer network (e.g., the LAN established by the router 116 of FIG. 1, the network 118 of FIG. 1, and/or a point-to-point connection). For instance, in at least one example, the network interface 206 utilizes sub-GHz wireless networking to transmit messages to other location-based devices, including the base station 114, for example. Bands that the network interface 206 may utilize for sub-GHz wireless networking include, for example, an 868 MHz band and/or a 915 MHz band. Use of sub-GHz wireless networking can improve operable communication distances and/or reduce power consumed to communicate. According to certain examples, when executing the code 208, the processor 200 controls the network interface 206 to stream (e.g., via UDP) sensor data (e.g., image data as described further below) to the base station 114. Alternatively or additionally, in at least one example, through execution of the code 208, the processor 200 can control the network interface 206 to enter a power conservation mode by powering down a 2.4 GHz radio and powering up a sub-GHz radio that are both included in the network interface 206. In this example, through execution of the code 208, the processor 200 can control the network interface 204 to enter a streaming or interactive mode by powering up a 2.4 GHz radio and powering down a sub-GHz radio, for example, in response to receiving a wake signal from the base station via the sub-GHz radio.

Continuing with the example of FIG. 2, the image capture device 110 may further include an image sensor assembly 220. Some examples further include a light source 226, a speaker 228, and a microphone 230. In some examples, the light source 226, the speaker 228, and/or the microphone 230 form part of the user interface 212, as described further below. The image sensor assembly 220 may be coupled to the processor 200 (e.g., to allow for processing of images acquired by the image sensor assembly 220) and/or to the network interface 206 (e.g., to allow for transmission of images captured by the image sensor assembly 220) via the interconnection mechanism 216. Although not illustrated in FIG. 2, it will be appreciated that the speaker 228 and/or the microphone 230 may also be coupled to the processor 200 via the interconnection mechanism 216, for example.

The image sensor assembly 220 may include a lens and one or more light-sensitive sensors. For example, the image sensor assembly 220 may include one or more image sensors 222 (e.g., a charge-coupled device or an active-pixel sensor) and/or one or more temperature or thermographic sensors (e.g., an active and/or passive infrared (PIR) sensor 224). The image sensor(s) 222 can be configured to capture images in one or more spectral bands of the electromagnetic spectrum. In some examples, the image sensor(s) 222 collect still image frames and/or video image frames constituting a video feed/stream. The image sensor(s) 222 may operate in the visible spectral band and/or the infrared spectral band, for example, as described further below. As shown in FIG. 2, the image sensor(s) 222 and the PIR sensor 224 may be coupled to the processor 200, for example, via the interconnection mechanism 216.

The light source 226 may include at least one light emitting diode (LED) that emits light in at least a portion of the visible spectrum, such as one or more red-green-blue emitting LEDs, for example. The light source 226 may also include one or more infrared emitting diodes in some examples. For example, the light source 226 may include one or more infrared emitting diodes that emit radiation (e.g., light) in the near infrared (NIR) spectral band, or other portions of the infrared spectrum. The speaker 228 may include a transducer configured to emit sound in the range of 40 dB to 80 dB or louder. Further, in some examples, the speaker 228 can include a siren configured to emit sound in the range of 70 dB to 95 dB or louder. The microphone 230 may include a micro electro-mechanical system (MEMS) microphone.

In the example of FIG. 2, the image capture device 110 further includes a wall mount 232, and a magnet 234. The wall mount 232 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 234 to magnetically couple to the wall mount 232, thereby holding the image capture device 110 in place.

Continuing with the example of FIG. 2, through execution of the code 208, the processor 200 can control operation of the user interface 212. In some examples, the user interface 212 includes user input and/or output devices (e.g., physical buttons, a touchscreen, a display, the speaker 228, the image sensor assembly 220 (or a part thereof), an accelerometer, a biometric scanner, an environmental sensor, the light source 226, etc.) and a software stack including drivers and/or other code 208 that is configured to communicate with the user input and/or output devices. As such, the user interface 212 enables the image capture device 110 to interact with users to receive input and/or render output. This rendered output can include, for instance, one or more GUIs including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218.

For example, through execution of the code 208, the processor 200 can control operation of the image sensor assembly 220, the light source 226, the speaker 228, and the microphone 230. For instance, in at least one example, when executing the code 208, the processor 200 controls the image sensor assembly 220 to acquire sensor data, in the form of image data, to be streamed to the base station 114 (or one of the processes 130, 128, or 132 of FIG. 1) via the network interface 206. Alternatively or additionally, in at least one example, through execution of the code 208, the processor 200 controls the light source 226 to emit light so that the image sensor assembly 220 collects sufficient reflected light to compose the image data. Further, in some examples, through execution of the code 208, the processor 200 controls the speaker 228 to emit sound. This sound may be locally generated (e.g., a sonic alarm via the siren) or streamed from the base station 114 (or one of the processes 130, 128 or 132 of FIG. 1) via the network interface 206 (e.g., utterances from the user or monitoring personnel). Further still, in some examples, through execution of the code 208, the processor 200 controls the microphone 230 to acquire sensor data in the form of sound for streaming to the base station 114 (or one of the processes 130, 128 or 132 of FIG. 1) via the network interface 206.

It should be noted that, in some examples of the image capture device 110, the operations executed by the processor 200 while under control of the code 208 may be hardcoded and/or implemented in hardware, rather than as a combination of hardware and software. Moreover, execution of the code 208 can implement the camera agent 138 of FIG. 1 and can result in manipulated data that is a part of the data store 210.

Continuing with the example of FIG. 2, the battery assembly 214 can be configured to supply operational power to the various components of the image capture device 110. In some examples, the battery assembly 214 includes at least one rechargeable battery (e.g., one or more NiMH or lithium batteries). In some examples, the rechargeable battery has a runtime capacity sufficient to operate the image capture device for 24 hours or longer if the image capture device 110 is disconnected from or otherwise not receiving line power. Alternatively or additionally, in some examples, the battery assembly 214 includes power supply circuitry to receive, condition, and distribute line power to both operate the image capture device 110 and recharge the rechargeable battery. The power supply circuitry can include, for example, a transformer and a rectifier, among other circuitry, to convert AC line power to DC device and recharging power.

The image capture device 110 may be a battery-powered outdoor sensor configured to be installed and operated in an outdoor environment, such as outside a home, office, store, or other commercial or residential building, for example. The image capture device 110 may instantiate the image capture devices 110a and/or 110b illustrated in FIG. 1. In some examples, the image capture device 110 may be part of a monitoring system or security system. However, in other applications, the image capture device 110 need not serve a security function and/or may be part of a smart home system or device that is not part of a security system. Accordingly, examples and aspects of the image capture device 110 described herein are not limited to security systems and/or security applications.

In one example, the PIR sensor 224 operates as a motion detector. PIR sensors are motion sensors that detect changes in temperature over a pre-determined field of view. The PIR sensor 224 can be configured with a threshold such that any change larger than the threshold constitutes motion and causes the image capture device 110 to take some further action, such as issuing an alert and/or communicating information to the base station 114. In some examples, the PIR sensor 224 can be tuned to detect people and/or animals based on a known temperature range associated with the body temperatures of people and/or animals.

According to certain examples, the image capture device 110 operates in a low power state (operating mode) in which the image sensor 222 (and optionally other components of the image capture device 110, such as the light source 226, for example) are deactivated, until motion is detected by the PIR sensor 224. Thus, in some examples, in the low power operating mode, the PIR sensor 224 remains active, but components that generally consume more power, such as the image sensor 222, for example, are powered off. In the low power operating mode, the processor 200 may perform minimal processing, sufficient to monitor for events that trigger the PIR sensor 224. When the PIR sensor 224 indicates motion and issues a signal or notification (e.g., sends a motion trigger signal to the processor 200), the processor 200 is placed into a normal operating mode, in which the image sensor 222 (along with any other components of the image capture device 110 that are powered off in the low power mode) is enabled. Thus, the PIR sensor 224 can act as a mode "switch" that configures the image capture device 110 into the "full power" or normal operating mode only when necessary. In this manner, power can be conserved by operating the image capture device 110 in the low power mode, with various components powered off, until a potential event of interest is detected.

Once active, the image sensor 222 captures one or more frames of image data. In some examples, the image sensor 222 passes the frame(s) of image data ("images" or "image frames") to the processor 200 for processing. In examples, the processor 200 applies a motion detection process to the captured image frames to detect moving objects, which may then be identified as either objects of interest (e.g., people), detection of which may cause the image capture device 110 to issue an alert, or benign objects that can be safely ignored.

Still referring to FIG. 2, in some examples, the processor 200 includes a neural processing unit (NPU) 236 for efficiently running neural networks to perform aspects of a motion detection process based on the image frames captured by the image sensor 222. In examples, the image capture device 110 is capable of detecting, and distinguishing between, certain objects, such as people or pets, for example, in the image frames captured by the image sensor 222, and can be configured to communicate an object detection event if an object of interest is identified. The image capture device 110 can use any of a variety of techniques to locate and recognize objects in an image frame. For example, computer vision based object detection can use specialized filters for locating different attributes or features within an image frame and then combining the features to classify whether or not a particular category of object is found. For example, an object detector can locate all human faces in a frame. In some examples, the NPU 236 can be configured to implement machine learning based processes or models that are trained on a vast number of images containing objects of interest to recognize similar objects in new or previously unseen images. In addition, examples of the image capture device 110 are configured to detect motion relative to recognized objects. Motion detection is the process of detecting a change in position of an object relative to its surroundings or the change in the surroundings relative to an object. In some examples, motion detection based on image processing can be performed by computing the pixel-to-pixel difference in intensity between consecutive frames to create a "difference image" and then applying a threshold to the difference image. In certain examples, any difference values larger than the threshold constitute motion.

In some examples, some or all of the image processing described herein may be performed by the processor 200. In some examples, the image capture device 110 can transmit (e.g., via the network interface 206) processed and/or unprocessed images, or summaries thereof, from the image sensor assembly 220 to a remote device for (further) processing and/or analysis. The image capture device may further transmit metadata associated with the images (which may include the summaries of the images) to the remote device.

As discussed above, in certain examples, the image capture device 110 performs active imaging in which the image sensor 222 operates in conjunction with the light source 226 that illuminates the scene. In particular, during low light conditions, such as at night, for example, the ability of the image sensor 222 to acquire images of the scene with reasonable clarity may depend on the light source 226 providing sufficient illumination. As described above, in some instances, near infrared (NIR) imaging can offer advantages in low-light conditions, at least in part because the infrared image sensor may detect more photons than image sensors operating in other parts of the electromagnetic spectrum. NIR imaging may also provide sharper and higher contrast images than visible-band imaging. However, visible-band imaging, also referred to as color imaging, may offer other advantages. For example, color images may allow for observation of features that cannot be distinguished in NIR images. Further, active color imaging uses visible-band illumination, which can also be used for other purposes, such as to get a Person of Interest's (POI's) attention, deter a POI from proceeding into, or remaining at, a property, or illuminate a walkway, to give a few examples.

Thus, according to certain examples, the image capture device 110 can be configured to operate in multiple active imaging modes, including a color imaging mode and an NIR imaging mode, for example. In some examples, the image capture device 110 may include an "inverted" imaging mode, in which an image sensor 222 generally configured for imaging in a first region of the electromagnetic spectrum (e.g., an infrared image sensor) is used to capture images responsive to reflections of light in a second region of electromagnetic spectrum (e.g., light in the visible spectral band). Examples of operating the image capture device 110 in the inverted imaging mode are described in more detail below. In some examples, a user may operate the image capture device 110 (e.g., through the user interface 212 or via a customer device 122) to switch between different imaging modes. In some examples, the image capture device 110 may switch between different imaging modes is response to a trigger event, which may be a command from a user or monitoring personnel, for example, or may be another type of event, such as detection (e.g., by the image capture device 110 or another device) of motion or of an object of interest (e.g., a person) in proximity to the image capture device 110, for example.

Figure 3:
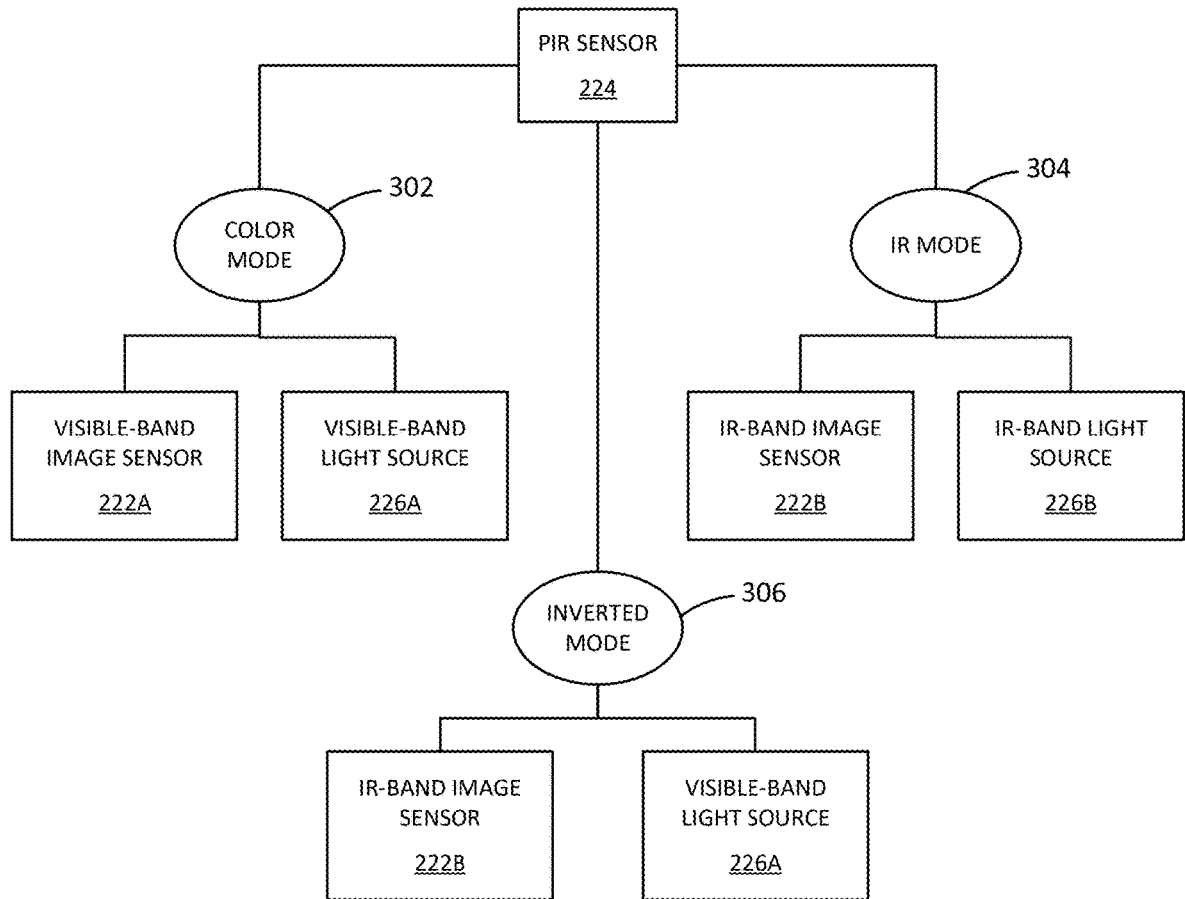
FIG. 3 is a state diagram illustrating different operating modes of an image capture device, according to some examples described herein.

Referring to FIG. 3, there is illustrated a state diagram showing operation of a device or camera (e.g., the image capture device 110) in any of a plurality of different imaging modes. In this example, the image capture device 110 includes the PIR sensor 224 (as described above), along with a visible-band image sensor 222A and an infrared (IR-band) image sensor 222B. In addition, in this example, the light source 226 includes a visible-band light source 226A and an infrared light source (IR-band light source, also referred to as an infrared emitter) 226B. It will be appreciated that either or both of the visible-band light source 226A and/or the IR-band light source 226B may include one or more emitters (e.g., LEDs or infrared emitting diodes). In some examples, the image capture device 110 may operate in a color imaging mode 302, an infrared red (IR) imaging mode 304, or an inverted mode 306.

According to certain examples, in the color mode 302 of imaging, the visible-band image sensor 222A and the visible-band light source 226A are active. The visible-band light source may emit light over at least a portion of the visible spectrum. As used herein, the term "visible spectrum" refers to the region of the electromagnetic spectrum extending from blue wavelengths to red wavelengths. For example, the visible spectrum may include wavelengths in a range of about 380 nanometers (nm) to about 740 nm (e.g., ±40 nm), and corresponds generally to the portion of the electromagnetic spectrum that is visible or otherwise perceivable to the human eye. A "visible spectral band" may include some or all wavelengths in the visible spectrum. In some examples, the visible-band light source 226A emits light over a wavelength range of about 600-660 nm. However, in other examples, other portions of the visible spectrum may be used. In the color mode 302, the visible-band image sensor 222A may acquire images (e.g., still images and/or video imagery) responsive to received reflections of the light emitted by the visible-band light source 226A from objects in a scene that is viewed by (e.g., within the field of view of) the visible-band image sensor 222A and illuminated by the visible-band light source 226A. In some examples, while the image capture device 110 is operating in the color mode 302, the IR-band image sensor 222B and the IR-band light source 226B may be inactive (e.g., turned off). In some examples, the image sensor assembly 220 includes one or more filters to block reception of IR wavelengths by the visible-band image sensor 222A during operation of the image capture device 110 in the color mode 302.

In the IR mode 304 of imaging, the IR-band image sensor 222B and the IR-band light source 226B may be active. In some examples, the IR-band light source 226B emits radiation (or light) over at least a portion of the infrared spectrum (also referred to as the infrared spectral range). As used herein, the "infrared spectrum" refers to a portion of the electromagnetic spectrum that begins with wavelengths just longer than those of red light (the longest wavelengths in the visible spectrum) and ends with wavelengths just shorter than those in the microwave range. The infrared spectrum may include wavelengths ranging from approximately 740 nm (e.g., ±40 nm) to one millimeter (mm). The NIR spectral band resides just beyond the red end of the visible spectrum. In some examples, the NIR spectral band may cover a wavelength range from approximately 740 nm (e.g., ±40 nm) to 2500 nm (e.g., ±5% or 10%). In some examples, the IR-band light source 226B emits wavelengths in a range of about 770 nm-930 nm. However, in other examples, other wavelength ranges can be used. In some examples, the IR-band image sensor 222B has high QE (quantum efficiency) performance at NIR wavelengths. In the IR mode 304, the IR-band image sensor 222B may acquire images (e.g., still images and/or video imagery) responsive to received reflections of emissions by the IR-band light source 226B from objects in the scene that is viewed by the IR-band image sensor 222B and illuminated by the IR-band light source 226B. In some examples, while the image capture device 110 is operating in the IR mode 304, the visible-band image sensor 222A and the visible-band light source 226A may be inactive.

Both the color mode 302 and the IR mode 304 may offer various advantages and benefits. For example, imaging in the color mode 302 may provide color images, which may depict features not identifiable/distinguishable in mono-chrome images. In the color mode 302, the image capture device 110 may use wavelengths for illumination and imaging that are visible to humans, which may provide certain advantages and/or allow for additional functionality. For example, the visible-band illumination may also illuminate the scene for a user, which may allow the user to more clearly see walkways and/or other structures. Furthermore, visible illumination may deter an intruder from entering the premises. In contrast, imaging in the IR mode 304 uses infrared illumination (e.g., in the NIR spectral band), which is not visible to humans. Imaging in the IR mode 304 may provide images with higher contrast and sharpness, particularly at night or in other very low light conditions. The IR mode 304 may have a longer visibility range and better image quality than the color mode 302 in night-time or other low light conditions.

As described above, in some instances, the PIR sensor 224 may act as a switch, or wake trigger, such that the image capture device 110 is configured to activate (e.g., "wake up") the image sensors 222A and/or 222B in response to a signal from the PIR sensor 224. For example, the PIR sensor 224 may detect motion and provide a signal (e.g., a motion detection signal) to activate the image sensors 222A and/or 222B. In some examples, a user-configurable setting for the image capture device 110 may control whether, when activated in response to a signal from the PIR sensor 224 or another wake trigger, the image capture device 110 enters the color mode 302 of imaging or the IR mode 304 of imaging. In some instances, the IR mode 304 is the default night-vision (or low-light) setting due to superior imaging performance, as discussed above. However, a user may wish to also obtain benefits discussed above of the color mode 302.

In some examples, the image capture device 110 can be operated in the IR mode 304 with both the visible-band light source 226A and the IR-band light source 226B active. For example, a user may wish to operate the image capture device 110 in the IR mode 304 to obtain the benefits associated with NIR imaging. However, there are numerous circumstances in which a user may also want to activate the visible-band light source 226A. For example the visible-band light source 226A can be used to attract a person of interest's (POI's) attention or otherwise cause the POI to involuntarily react to an output of light. This may make the POI turn towards the image capture device 110 and make the POI more visible in images captured by the image capture device 110, which could help an operator, monitoring personnel, and/or first responders to identify the POI. Visible-band illumination may also be used to deter a POI by showing that the POI is being monitored. In addition, as described above, the visible-band light source 226A could also be used to illuminate a walkway or area for better visibility. However, simultaneous activation of both the visible-band light source 226A and the IR-band light source 226B involves more thermal dispersion than when the two light sources 226A, 226B are activated independently or in a singular fashion (e.g., one is on while the other is off). This thermal management issue may arise because not only may the current/power draw of the light sources 226A, 226B be very high, but also the light sources themselves emit heat when active. Overheating can damage the camera circuitry or create risk of fire, etc. Furthermore, the temperature of the image capture device 110 can be raised during normal usage from factors including direct sunlight, seasonal temperatures, and/or use of the network interface 206 to stream images to remote devices, to give a few examples. Accordingly, while operating both light sources 226A, 226B simultaneously can offer some benefit, it may also have disadvantages or drawbacks associated therewith.

In some examples, the image capture device 110 can be transitioned between the color mode 302 and the IR mode 304, either directly by a user, or in response to other trigger events or conditions. For example, the image capture device 110 may be activated in the IR mode 304 in response to detection of motion by the PIR sensor 224 or another sensor, as described above, and then may be transitioned into the color mode 302, or vice versa. However, when the image capture device 110 is transitioned from the IR mode 304 to the color mode 302, it performs auto exposure adjustments (e.g., to adjust aperture, shutter speed, and/or other settings to regulate the amount of light reaching the image sensor) for several seconds before reaching a well-exposed image because the different image sensors 222A, 222B respond differently to incident light, and the light levels provided by the different light sources 226A, 226B may also vary. As described above, in some examples, the image sensor assembly 220 includes a filter, such as a visible-pass filter (e.g., one that passes visible light and blocks IR emissions), that is activated in the color mode 203 and deactivated in the IR mode 304. Activation/deactivation of the filter as the image capture device 110 transitions between the IR mode 304 and the color mode 302 can significantly change the amount of light reaching the image sensor(s) 222A and/or 222B. This transition can completely wash out details of the scene and severely diminish the visibility of potential objects of interest (e.g., a person or vehicle), which can be highly problematic in emergency situations, for example, because a monitoring user can lose track of the object(s) of interest.

Accordingly, examples provide techniques by which benefits associated with aspects of both color mode 302 imaging and IR mode 304 imaging can be achieved. As described above, according to certain examples, the image capture device 110 can be operated in the inverted mode 306 of imaging, in which the IR-band image sensor 222B is used in conjunction with the visible-band light source 222A. Operation in the inverted mode 306 may be counter-intuitive in that an out-of-band illumination source (e.g., the visible-band light source 226A) is used relative the image sensor (e.g., the IR-band image sensor 222B). However, as described below, experiments have demonstrated that the visible-band light source 226A can adequately illuminate the scene for NIR imaging using the IR-band image sensor 222B, while advantageously also illuminating the scene for human perception. In addition, using only the visible-band light source 226A for illumination during IR-band imaging in the inverted mode 306 (without using the IR-band light source 226B) may provide a manner in which to reduce the thermal mitigation needed on-board the image capture device 110, while still offering the benefits described above.

In some examples, the image capture device 110 can be configured (e.g., via a user-configurable setting) to operate in the inverted mode 306 in response to a signal from the PIR sensor 224. In other examples, the image captured device can be configured to default to operation in the IR mode 304 in response to a signal from the PIR sensor 224, and may be transitioned to operation in the inverted mode 306 in response to a trigger event or condition. For example, a user or monitoring personnel may instruct the image capture device 110 to transition to the inverted mode 306. In another example, while operating in the IR mode 304, the image capture device 110 (or another device that receives images from the image capture device 110) may process acquired images and detect motion and/or an object of interest. Such detection may be a trigger event that causes the image capture device 110 to transition to the inverted mode 306 (e.g., to provide human perceptible illumination in response to detection of a person).

Transitioning the image capture device 110 from the IR mode 304 to the color mode 302 involves transitioning from imaging using the IR-band image sensor 222B to imaging using the visible-band image sensor 222A. As described above, this transition can involve a potentially significant delay (e.g., up to several seconds) in the image capture device 110 being able to acquire well-exposed images for further analysis. In contrast, transitioning the image capture device 110 from the IR mode 304 to the inverted mode 306 involves switching only the light sources 226A, 226B, since in both modes, imaging is performed using the IR-band image sensor 222B. In some examples, transitioning between imaging (with the IR-band image sensor 222B) using the IR-band light source 226B and imaging (with the IR-band image sensor 222B) using the visible-band light source 226A may involve less than a second of exposure adjustments, and details depicted in the acquired images may remain visible through the transition.

Figure 4A:
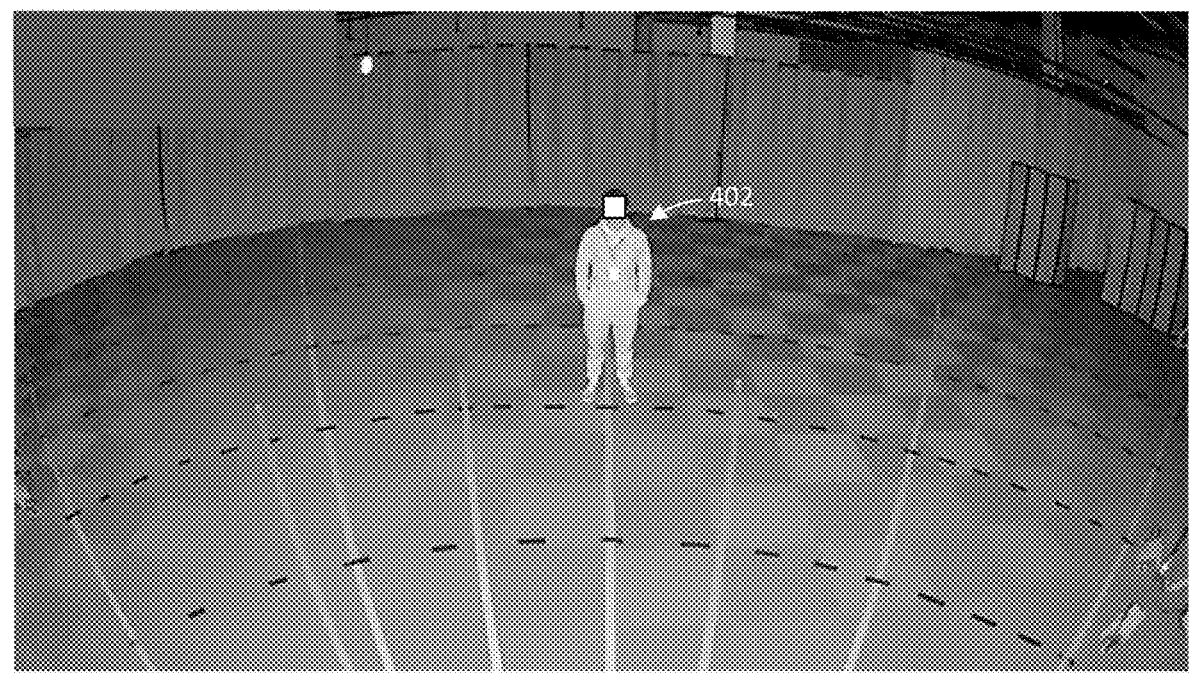
FIG. 4A is a first image frame acquired using an infrared image sensor of an image capture device after transitioning the image capture device from illuminating the scene with a visible-band LED to illuminating the scene with a NIR-band LED.
Figure 4B:
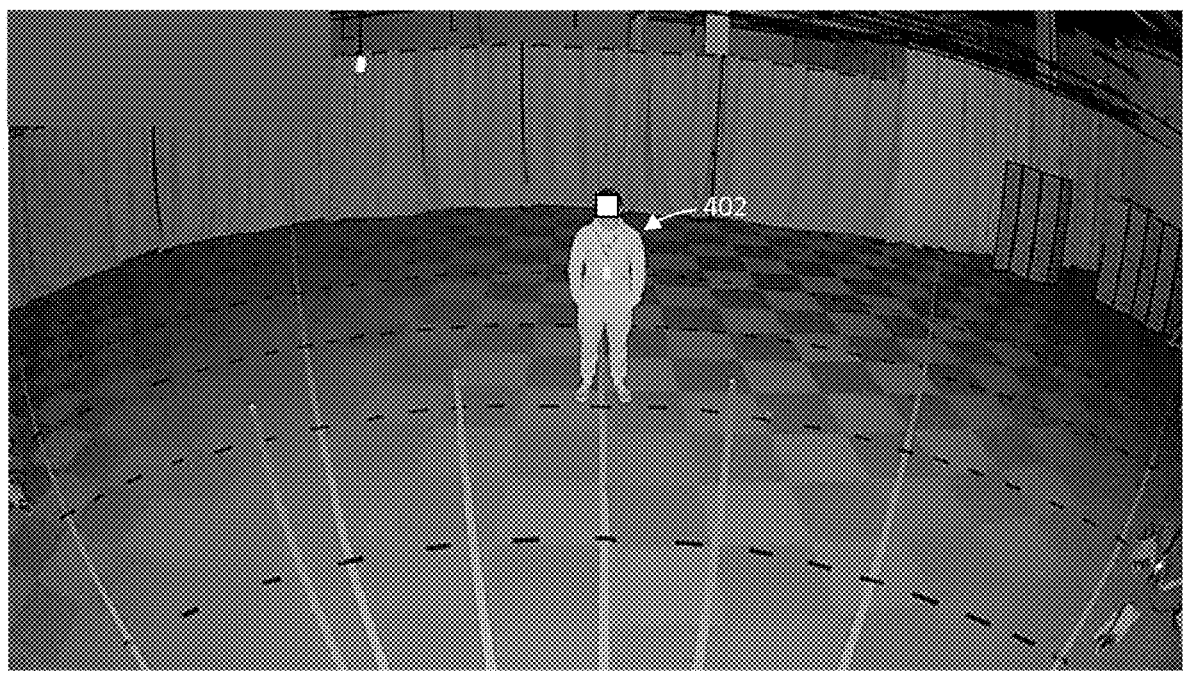
FIG. 4B an image frame acquired using the infrared image sensor of the image capture device once the image capture device reached steady-state exposure after transitioning the image capture device from illuminating the scene with the visible-band LED to illuminating the scene with the NIR-band LED.
Figure 4C:
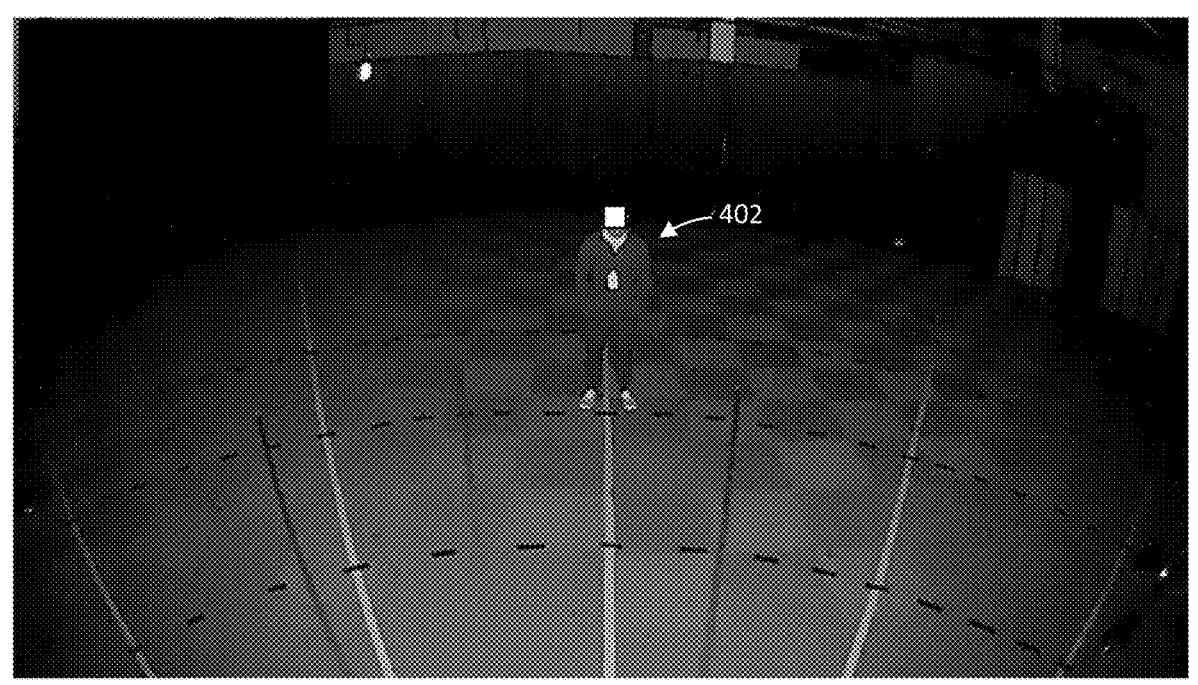
FIG. 4C is a first image frame acquired using the infrared image sensor of the image capture device after transitioning the image capture device from illuminating the scene with the NIR-band LED to illuminating the scene with the visible-band LED.
Figure 4D:
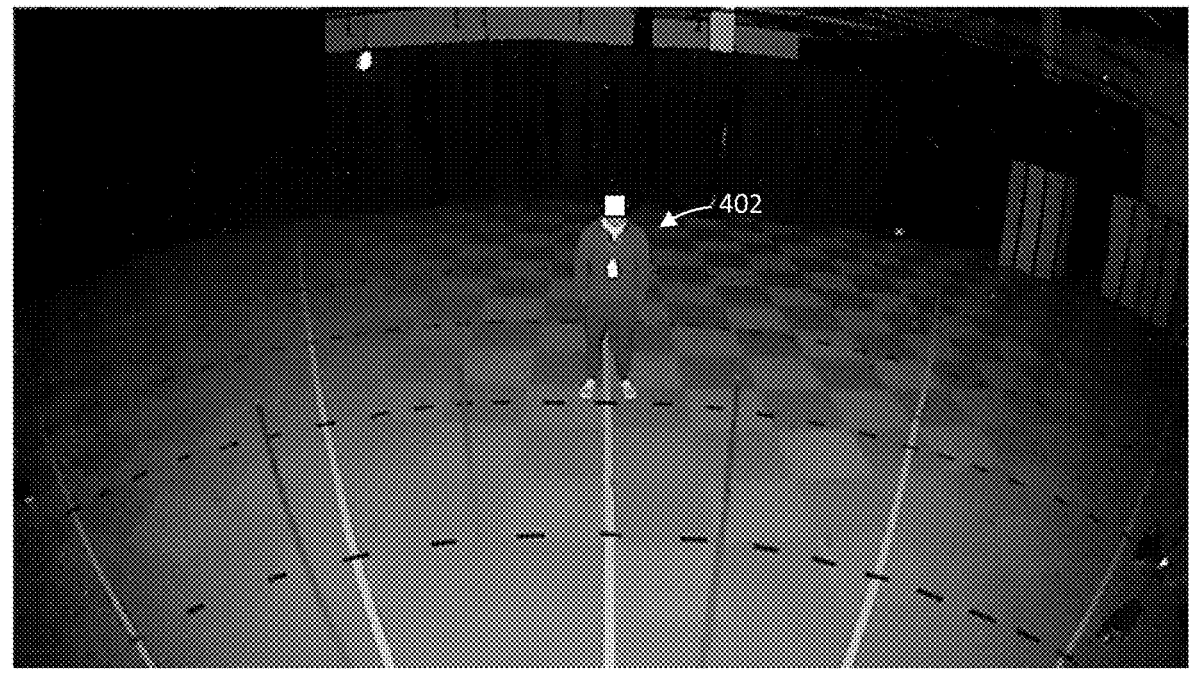
FIG. 4D is an image frame acquired using the infrared image sensor of the image capture device once the image capture device reached steady-state exposure after transitioning the image capture device from illuminating the scene with the NIR-band LED to illuminating the scene with the visible-band LED.

For example, FIGS. 4A-4D illustrate images acquired using an example of the IR-band image sensor 222B responsive to illumination from an example of the IR-band light source 226B (FIGS. 4A and 4B) and from an example of the visible-band light source 226A (FIGS. 4C and 4D). FIGS. 4A and 4B illustrate images acquired by the IR-band image sensor 222A after transitioning from illuminating the scene using the visible-band light source 226A to illuminating the scene using the IR-band light source 226B (e.g., after activating the IR-band light source 226B and deactivating the visible-band light source 226A). FIG. 4A depicts the first image frame acquired by the IR-band image sensor 226B after the transition, while FIG. 4B depicts an image frame acquired after the image sensor assembly 220 has reach steady-state exposure conditions. As may be seen by comparing FIGS. 4A and 4B, a person 402, along with other features of the scene, are clearly visible in both images, with only a slight reduction in exposure quality from FIG. 4B to FIG. 4A. FIGS. 4C and 4D illustrate images acquired by the IR-band image sensor 222A after transitioning from illuminating the scene using the IR-band light source 226B to illuminating the scene using the visible-band light source 226A (e.g., after deactivating the IR-band light source 226B and activating the visible-band light source 226A). Thus, FIGS. 4C and 4D are examples of images acquired by the image capture device 110 operating in the inverted mode 306. FIG. 4C depicts the first image frame acquired by the IR-band image sensor 226B after the transition, while FIG. 4D depicts an image frame acquired after the image sensor assembly 220 has reach steady-state exposure conditions. As may be seen with reference to FIGS. 4A-D, the person 402, along with some other features of the scene, remains visible in both images, with also only a slight reduction in exposure quality from FIG. 4D to FIG. 4C. In FIGS. 4A-D, the face of the person 402 is deliberately obscured for privacy.

Thus, as demonstrated in FIGS. 4C and 4D, operating the image capture device 110 in the inverted mode 306 produces images of reasonable clarity in which potential objects of interest, such as the person 402, can be readily detected, while also offering several benefits. For example, as described above, using the inverted mode 306 for imaging may advantageously allow use of visible-band illumination for human perception while reducing heating of the image capture device 110 (which may occur if the visible-band light source 226A and IR-band light source 226B are operated simultaneously). In addition, transition between the IR mode 304 and the inverted mode 306 may avoid the temporary loss of visibility/clarity that can occur during transitions between the color mode 302 and the IR mode 304. Operation of the image capture device 110 in the inverted mode 306 may be further understood with reference to FIG. 5.

Figure 5:
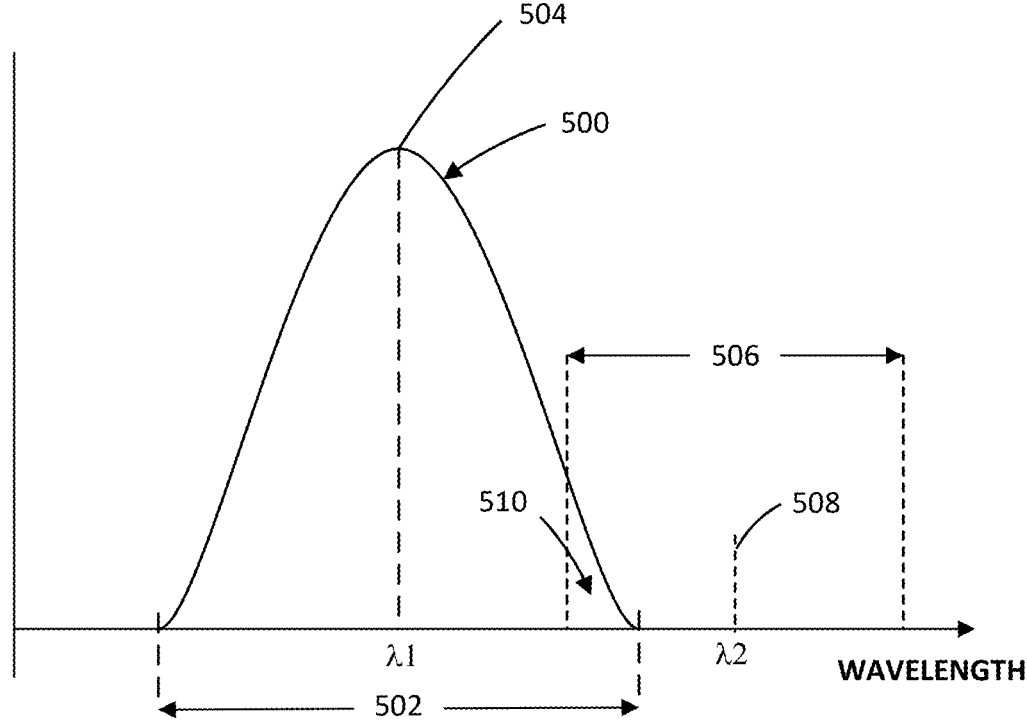
FIG. 5 is a graph schematically illustrating an emission spectrum of a light source and a sensitivity region of an image sensor, according to some examples described herein.

Turning to FIG. 5, illustrated is a graph shown an example of light 500 emitted by the visible-band light source 226A, with wavelength (in arbitrary units and not necessarily to scale) represented on the horizontal axis and intensity represented (in arbitrary units and not necessarily to scale) on the vertical axis. The visible-band light source 226A emits the light 500 having a first wavelength range 502 and a first peak wavelength 504 ($\lambda 1$). Typically, for active imaging modes (such as the color mode 302 and the IR mode 304), the light source is configured produce emissions in the same wavelength band in which the image sensor is light-sensitive (and thus configured to produce images in response to received emissions). For example, the emitted peak wavelength 504 is at or near the wavelength at which the image sensor has peak quantum efficiency (QE). QE is a measure of how well a device (e.g., the image sensors 222A or 222B) can detect and respond to light, for example, how effectively the device converts incident photons into electrical signals. Thus, for example, at peak QE, the device converts a highest percentage of incoming photons into a usable electrical signal. In some examples, the image capture device 110 has this "matching" configuration for operation in the color mode 302 and the IR mode 304. For example, the visible-band light source 226A emits the light 500 having the first wavelength range 502 and the visible-band image sensor 222A may have high QE over at least a portion of the first wavelength range 502, with a peak QE at or near the peak wavelength 504. The matching configuration is intuitive, since it makes sense, when using the visible-band image sensor 226A, for example, to emit visible light that reflects off various objects and surfaces such that the reflected light can be sensed by the visible-band image sensor 226A and provide information about the scene that is captured in the images produced by the visible-band image sensor 226A. The same is true for IR imaging in the IR mode 304. However, for operation in the inverted mode 306, the pairing between the light source and the image sensor is inverted. In some examples, as described above, the IR-band image sensor 222B is used in combination with the visible-band light source 226A.

Continuing with the example of FIG. 5, the IR-band image sensor 222B has a sensitivity band that extends over a second wavelength range 506. Thus, the IR-band image sensor 222B is sensitive to emissions (e.g., light) having wavelengths in the second wavelength range 506. The IR-band image sensor 222B has a peak QE at a second peak wavelength 508 (22). As shown in FIG. 5, unlike in "matched" imaging modes where the peak QE wavelength and the peak emission wavelength are the same or close to the same, here the first peak wavelength 504 (peak emission wavelength of the visible-band light source 226A) is substantially offset from the second peak wavelength 508 (peak QE wavelength of the IR-band image sensor 226B). As a result, the sensitivity band 506 of the IR-band image sensor 226B overlaps only partially in wavelength with the emission 500 from the visible-band light source 226A. That is, the first wavelength range 502 overlaps partially with the second wavelength range 506, such that there exists a region of overlap 510 (also referred to as the overlapping wavelength range/band), as shown in FIG. 5. Thus, the IR-band image sensor 222B is sensitive to the wavelengths of light emitted by the visible-band light source 226 that fall in the region of overlap 510. Accordingly, the IR-band image sensor 222B can produce images responsive to receiving reflections (e.g., from objects in the scene) of light in this overlapping wavelength band 510, as shown in FIGS. 4C and 4D, for example. In some examples, overlapping wavelength range 510 corresponds to a transition band between the visible spectrum and the infrared spectrum, particularly, the NIR spectral band. Thus, the emission 500 from the visible-band light source 226A may extend slightly into the NIR spectral band, and/or the sensitivity band 506 of the IR-band image sensor 222B may extend slightly into the visible spectrum. In either case, the illumination 500 from the visible-band light source 226A may sufficiently illuminate the scene for the IR-band image sensor 222B to capture images, thus allowing operation of the image capture device 110 in the inverted mode 306.

While the above examples have been described in the context of imaging in the inverted mode 306 using the IR-band image sensor 222B in combination with the visible-band light source 226A, it will be appreciated that in other examples, various other combinations of "mismatched" image sensors and light sources (or illumination wavelength ranges) can be used. Thus, the principles and techniques described herein extend to active imaging using any combination of image sensor and light source in which the peak emission wavelength of the light source (e.g., the first peak wavelength 502) and the peak QE wavelength of the image sensor (e.g., the second peak wavelength 508) are substantially offset from one another (in wavelength) yet there exists a region of overlap (e.g., the region 510) between the emission wavelength range (e.g., the first wavelength range 502) and the sensitivity band of the image sensor (e.g., the second wavelength range 506).

Figure 6A:
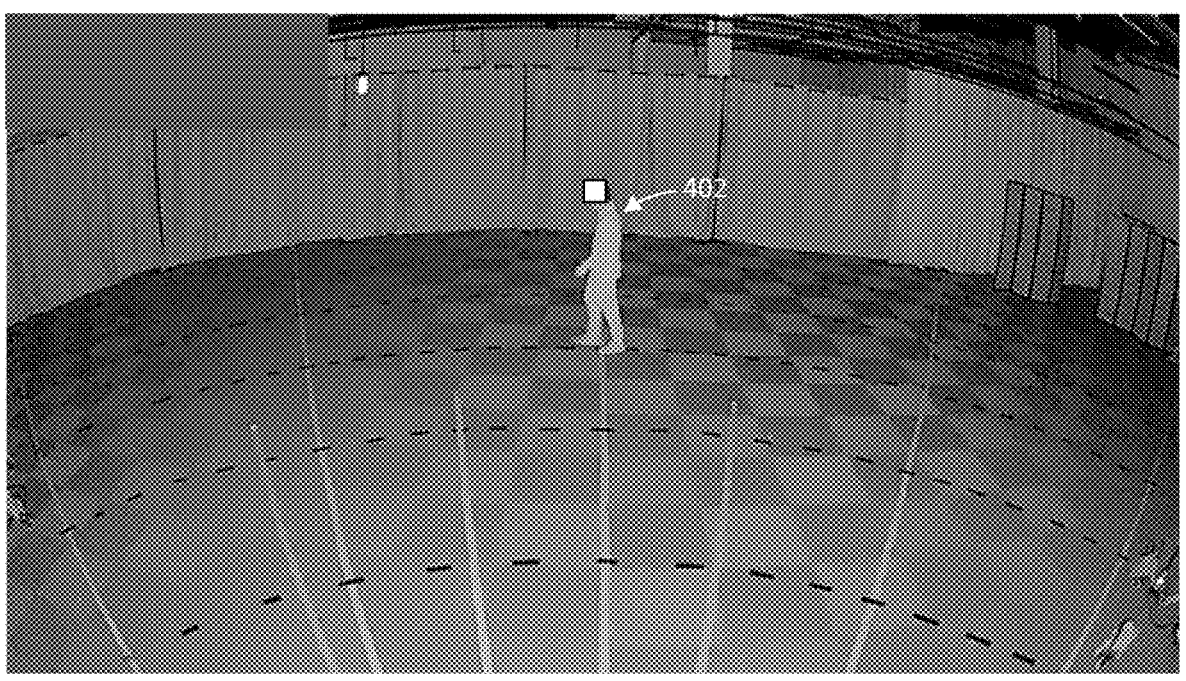
FIG. 6A is an image frame acquired using an infrared image sensor of an image capture device with the image capture device illuminating the scene with a NIR-band LED, the image depicting a person located 20 feet away from the image capture device.
Figure 6B:
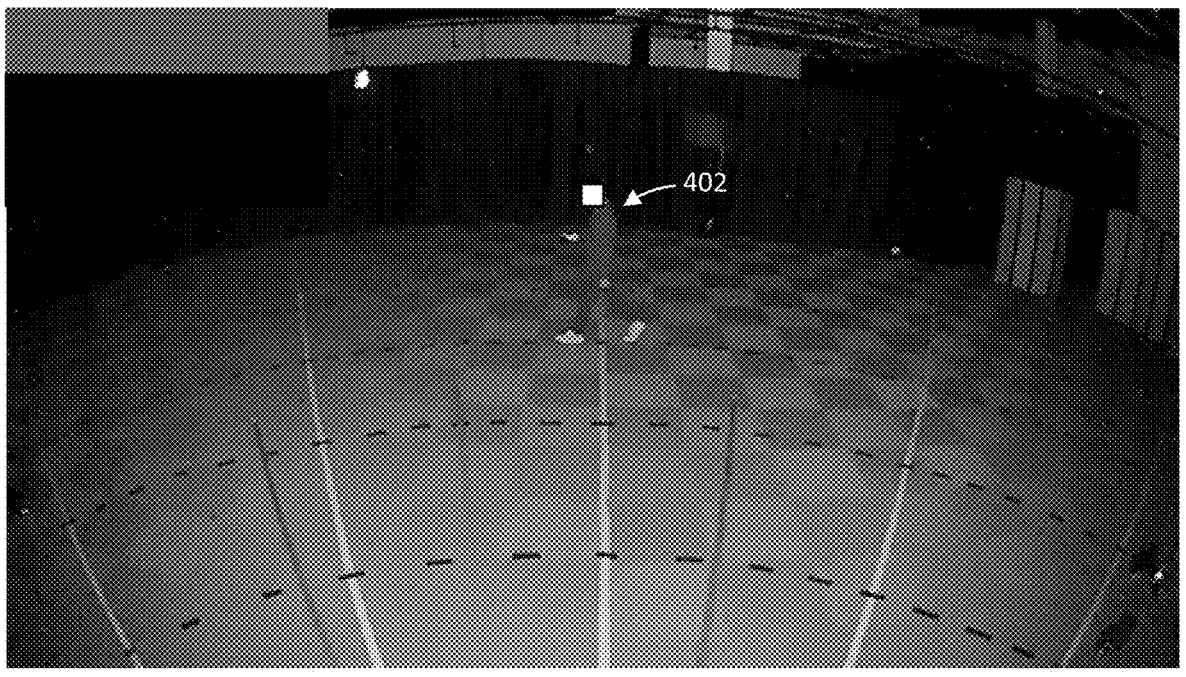
FIG. 6B is an image frame acquired using the infrared image sensor of the image capture device with the image capture device illuminating the scene with a visible-band LED, the image depicting the person located 20 feet away from the image capture device.
Figure 6C:
FIG. 6C is an image frame acquired using the infrared image sensor of the image capture device with the image capture device illuminating the scene with the NIR-band LED, the image depicting a person located 10 feet away from the image capture device.
Figure 6D:
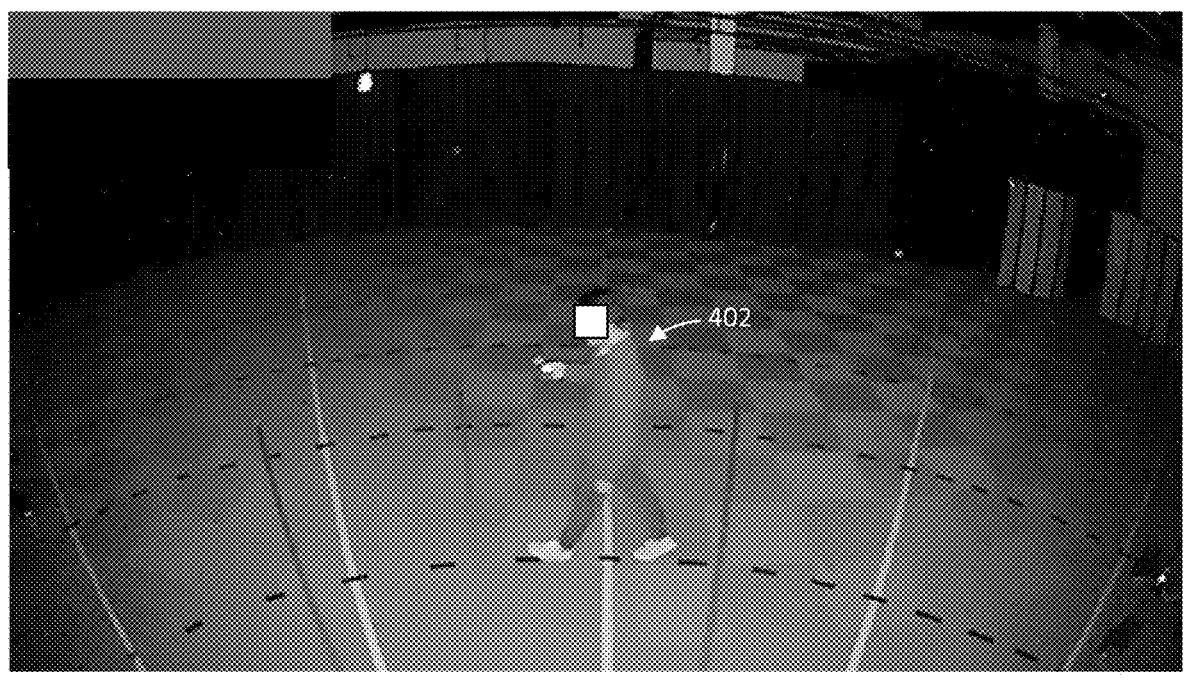
FIG. 6D is an image frame acquired using the infrared image sensor of the image capture device with the image capture device illuminating the scene with a visible-band LED, the image depicting the person located 10 feet away from the image capture device.
Figure 6E:
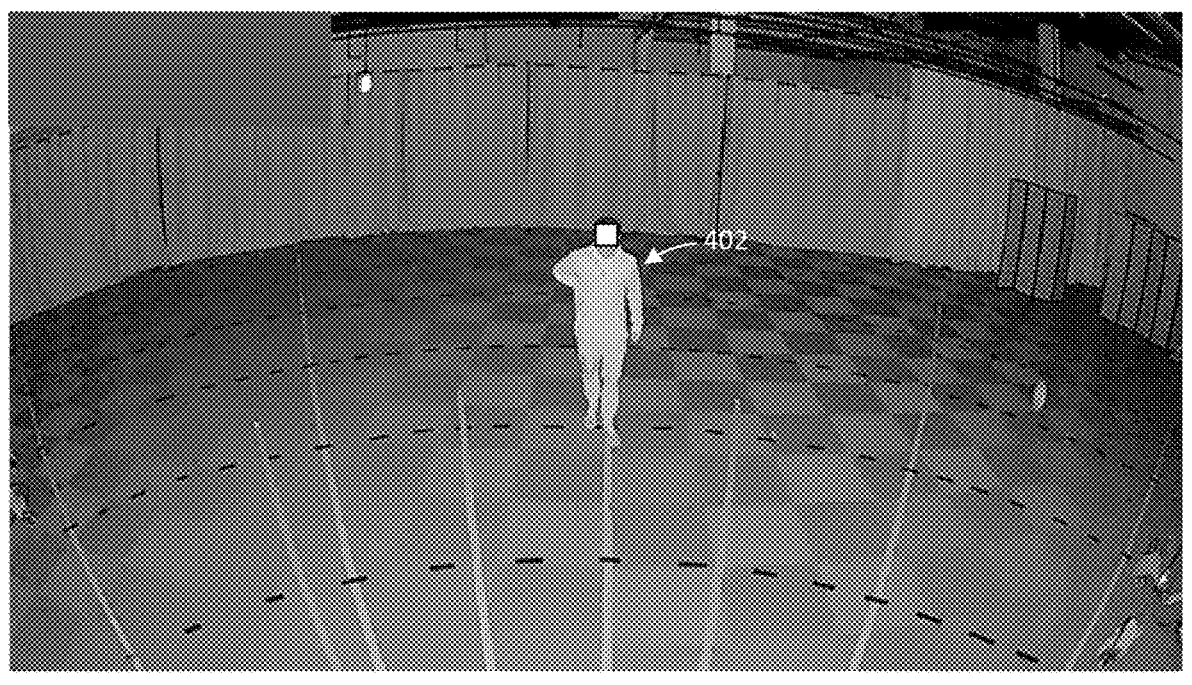
FIG. 6E is an image frame acquired using the infrared image sensor of the image capture device with the image capture device illuminating the scene with the NIR-band LED, the image depicting a person located 15 feet away from the image capture device and facing the image capture device.
Figure 6F:
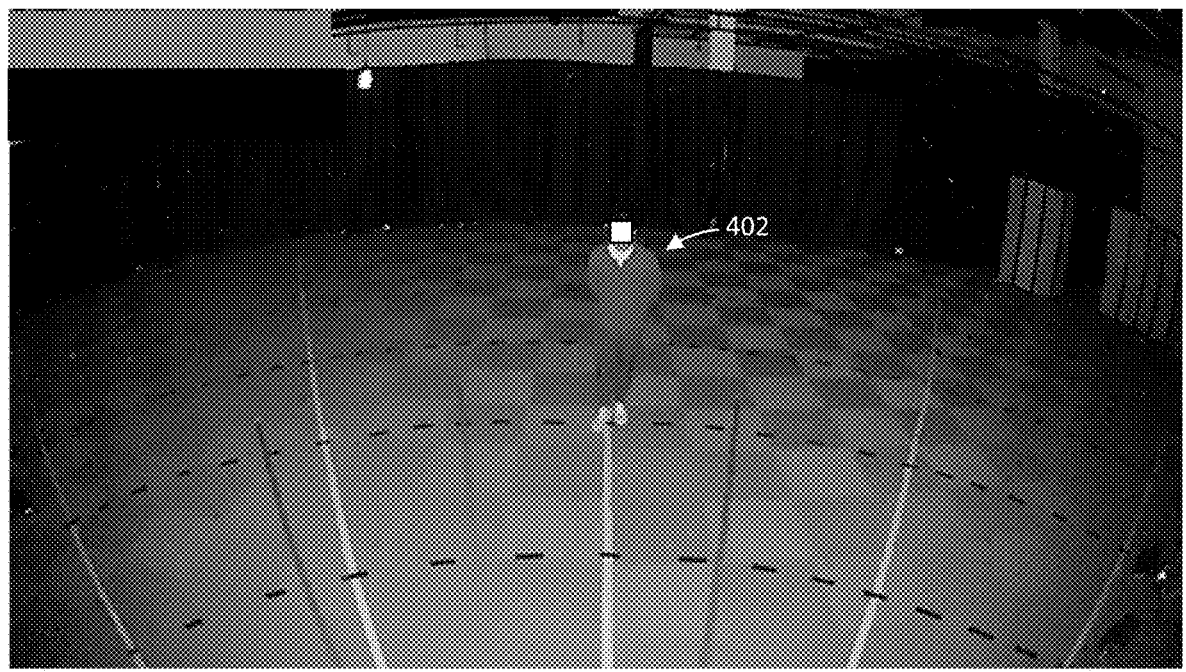
FIG. 6F is an image frame acquired using the infrared image sensor of the image capture device with the image capture device illuminating the scene with a visible-band LED, the image depicting the person located 15 feet away from the image capture device and facing the image capture device.

FIGS. 6A-F depict a set of images acquired with an example of the image capture device 110 operating in IR mode 304 (FIGS. 6A, 6C, and 6E) and in the inverted mode 306 (FIGS. 6B, 6D, and 6F). In these examples, the IR-band image sensor 222B is an NIR image sensor with high QE performance at NIR wavelengths in a range of approximately 750-950 nm. For the examples of FIGS. 6A, 6C, and 6E, the image capture device 110 is operated in the IR mode 304 with the visible-band light source 226A turned off, and the IR-band light source 226B includes a plurality of has IR LEDs emitting with high intensity at wavelengths in a range of about 770-930 nm. For the examples of FIGS. 6B, 6D, and 6F, the image capture device 110 is operated in the inverted mode 306 using the above-identified example of the IR-band image sensor 222B and an example of the visible-band light source 226A, with the IR-band light source 226B turned off. In these examples, and the visible-band light source 226A includes a visible-band LED that emits over a wavelength range of approximately 400-750 nm, with high intensity in a range of about 600-660 nm. Thus, at wavelengths around 750 nm, there is a region of overlap between the emission band from the visible-band light source 226A and the wavelength band in which the IR-band image sensor 222B can produce images, such as those illustrated in FIGS. 6B, 6D, and 6F.

FIGS. 6A-6F depict the person 402, along with various other features of the scene in which the person 402 is located. The face of the person 402 is deliberately obscured for privacy. For the images shown in FIGS. 6A and 6B, the person 402 is located 20 feet away from the image capture device 110. For the images shown in FIGS. 6C and 6D, the person 402 is located 10 feet away from the image capture device 110. For the images shown in FIGS. 6E and 6F, the person 402 is located 15 feet away from the image capture device 110 and is positioned facing the image capture device 110. As shown, operating the image capture device 110 in the inverted mode 306 produces the images of FIGS. 6B, 6D, and 6F with reasonably good image quality and in which the person 402 can be readily detected.

Figure 7:
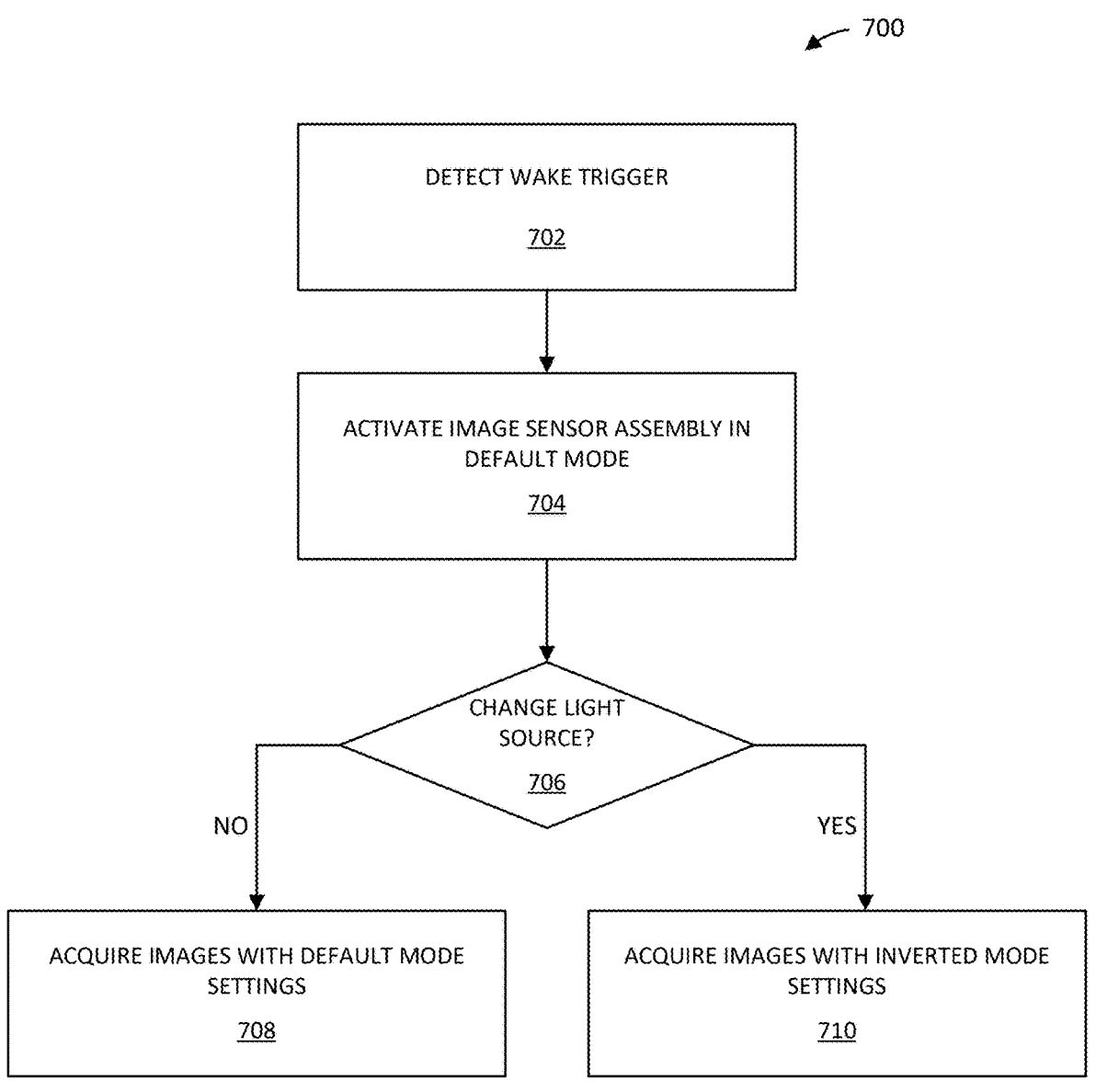
FIG. 7 is a flow diagram of a process of operating an image capture device, according to some examples described herein.

Referring now to FIG. 7, there is illustrated a flow diagram of a method 700 that can be used to operate the image capture device 110, according to certain examples.

At operation 702, the image capture device 110 may detect a wake trigger. In some examples, prior to and during operation 702, certain components on the image sensor assembly 220 may be inactivate (e.g., those used for active imaging). For example, the image sensor(s) 222 and/or light source(s) 226 may be turned off to conserve power. Some or all of these components may then be powered on (or activated) in response to a wake trigger detected at operation 702. The wake trigger may include a signal representing any of a variety of events or conditions. For example, as described above, the PIR sensor 224 can act as a wake trigger for other components of the image sensor assembly 220. Accordingly, in some examples, when the PIR sensor 224 detects motion in proximity to the image capture device, at operation 702, the PIR sensor 224 provides a signal (the wake trigger in this example) indicating that that motion has been detected. In other examples, the wake trigger can include a signal received from a remote device (e.g., responsive to an instruction from a user or monitoring personnel to activate the image sensor assembly 220 for imaging). In other examples, the wake trigger may include a signal generated by the user interacting with the user interface 212 of the image capture device. In other examples, the wake trigger may include a signal representing detection of motion (whether by the PIR sensor 224 or another sensor) in proximity to the image capture device 110.

At operation 704, in response to the wake trigger detected at operation 702, the image sensor assembly 220 may be activated in a default mode for active imaging. As described above, in some examples, the default mode can be selected according to user preferences (e.g., via a user-configurable setting of the image capture device 110). In some examples, the default mode activated at operation 704 may be the color mode 302 or the IR mode 304.

Operation 706 includes determining whether or not the light source 226 used to provide illumination for active imaging should be changed. For example, as described above, if (at operation 704) the image capture device 110 is configured into the IR mode 304 for imaging (with IR-band light source 226B active), there may be various circumstances in which a user may wish to activate the visible-band light source 226A instead. For example, it may be desirable to provide visible-band illumination for human perception (e.g., to illuminate a walkway or to attract the attention of a person of interest). The determination at operation 706 may be responsive to a signal or trigger event, for example. In some examples, prior to the determination at operation 706, the image capture device 110 may acquire one or more images of a scene while operating in the default mode. Those images may be processed to detect motion and/or one or more objects of interest (e.g., people, pets, vehicles, etc.). Accordingly, in some examples, a determination may be made to change the light source in response to detecting motion or an object of interest. In other examples, a determination to change the light source can be made responsive to user input via the network interface 206 (e.g., a signal from a remote device, such as a customer device 122 or the monitoring center environment 120) or via the user interface 212. Various other examples will be apparent in light of this disclosure.

If, at operation 706, a determination is made not to change the light source 226, the image capture device 110 may continue, or begin, to capture images in the default mode of imaging operation (with default mode settings) at operation 708. For example, if the default mode is the IR mode 304, the default mode settings may correspond to the IR-mode settings, such as to operate the IR-band image sensor 222B in combination with the IR-band light source 226B, while the visible-band light source 226A is turned off. Alternatively, if the default mode is the color mode 302, the default mode settings may correspond to the color-mode settings, such as to operate the visible-band image sensor 222A in combination with the visible-band light source 226A, while the IR-band light source 226B is turned off.

If, at operation 706, a determination is made to change the light source 226, the image capture device 110, the default mode light source may be deactivated and another light source activated. The image capture device 110 may then begin, at operation 710, to capture images in the inverted mode 306 of imaging operation (with inverted mode settings). For example, inverted mode settings may include operating the IR-band image sensor 222B in combination with the visible-band light source 226A (e.g., with the IR-band light source 226B turned off), or operating the visible-band image sensor 222A in combination with the IR-band light source 226b (e.g., with the visible-band light source 226A turned off). Numerous variations may be apparent in light of this disclosure.

As described above, configuring the image sensor assembly 220 between active imaging modes by changing only the light source used (rather than the light source and the image sensor) may allow for a faster transition without the loss of visibility that may occur when switching between different image sensors (e.g., transitioning between the color mode 302 and the IR mode 304). This can be particularly advantageous where change in imaging mode is desirable after a person of interest (or other object of interest) has detected, since in such circumstances it may be important to maintain the ability to detect the person (or object) of interest during the transition.

Figure 8:
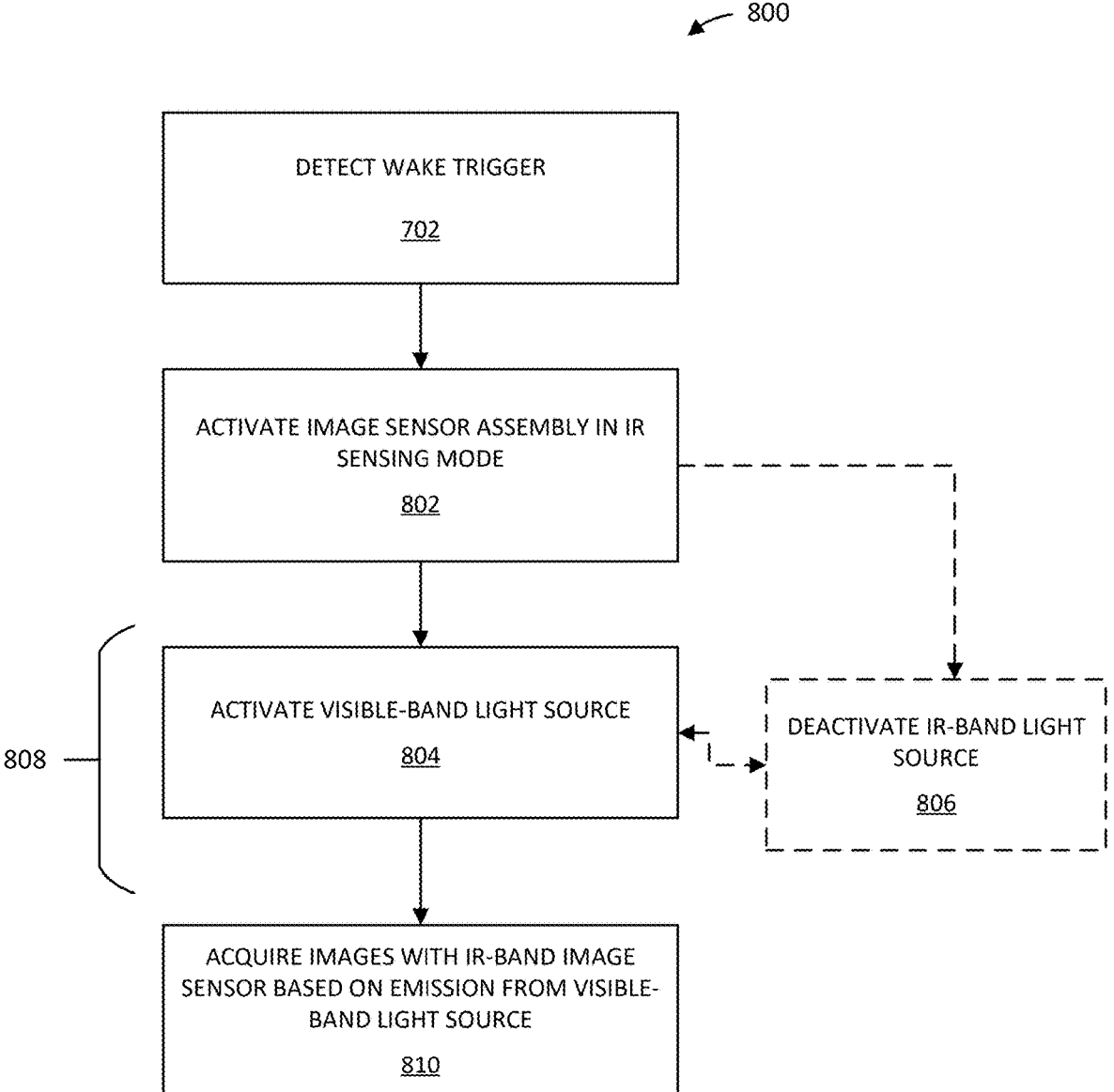
FIG. 8 is a flow diagram of another process of operating an image capture device, according to some examples described herein.

FIG. 8 illustrates a flow diagram of a method 800 of transitioning the image capture device 110 between the IR mode 304 and the inverted mode 306, according to certain examples.

As described above, operation 702 includes detecting a wake trigger, such as a notification (e.g., a signal) indicating that the PIR sensor 224 or another sensor detected motion or that some other trigger event occurred such that the image sensor assembly 220 is to be activated for active imaging.

At operation 802, the image sensor assembly 220 is activated to operate in the IR mode 304. As described above, for IR sensing/imaging in the IR mode 304, the IR-band image sensor 222B is used to acquire images responsive to reflections of emissions from the IR-band light source 226B. In the IR mode 304, the visible-band light source 226A may be inactive.

At operation 804, the visible-band light source 226A is activated.

The method 800 may further include operation 806 of deactivating the IR-band light source 226B. Operation 806 may be performed before or after operation 804. In some examples, operations 804 and 806 are performed substantially simultaneously. Together, operations 804 and 806 may constitute, at least in part, an operation 808 of transitioning the image sensor assembly 220 (and the image capture device 110) from the IR mode 304 to the inverted mode 306. As described above, in some examples, this transition 808 may be responsive to a determination made at operation 706.

At operation 810, the image capture device 110 acquires one or more images with the IR-band image sensor 222B based on (or responsive to) light emitted by the visible-band light source 226A.

As described above, configuring the image sensor assembly 220 between the IR mode 304 and the inverted mode 306 by switching between the IR-band and visible-band light sources 226B, 226A only (that is, without changing the image sensor 222B being used to capture images) may have several advantages. The images depicted in FIGS. 4C, 4D, 6B, 6D, and 6F demonstrate that imaging in the inverted mode 306 using the IR-band image sensor 222B and the visible-band light source 226A is a viable option for night-time or other low-light imaging. This mode of imaging may generate less heat at or within the image capture device than operating in the IR mode 304 or operating with both the IR-band light source 226B and the visible-band light source 226A active. In some circumstances, such as when the image capture device is recording a person of interest for example, it may be particularly desirable and/or important for the image capture device to maintain active imaging. However, in some instances, thermal management techniques (in particular, heat mitigation techniques) may reduce functionality of the image capture device 110 in order to prevent heat-related damage. For example, heat mitigation techniques may include deactivating one or more of the image sensors 222 and/or light sources 226. Accordingly, providing operation in the inverted mode 306 by which the image capture device 110 can reduce heat generation while maintaining good imaging performance may be advantageous in these and other circumstances.

Figure 9:
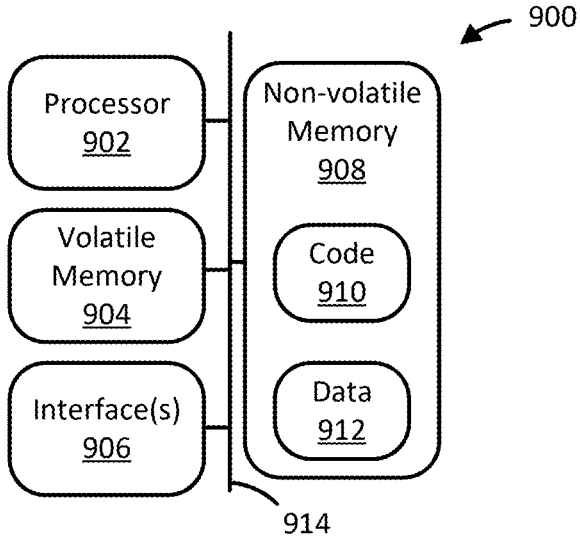
FIG. 9 is a schematic diagram of a computing device, according to some examples described herein.

Turning now to FIG. 9, a computing device 900 is illustrated schematically. As shown in FIG. 9, the computing device includes at least one processor 902, volatile memory 904, one or more interfaces 906, non-volatile memory 908, and an interconnection mechanism 914. The non-volatile memory 908 includes code 910 and at least one data store 912. The computing device 900 can be used to implement some or all aspects, components, and/or functionality of various systems and devices described herein, including, but not limited to, the image capture device 110, the monitoring center environment 130, the data center environment 124, the customer device(s) 122, and/or the base station 114.

In some examples, the non-volatile (non-transitory) memory 908 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 910 stored in the non-volatile memory can include an operating system and one or more applications or programs that are configured to execute under the operating system. Alternatively or additionally, the code 910 can include specialized firmware and embedded software that is executable without dependence upon a commercially available operating system. Regardless, execution of the code 910 can result in manipulated data that may be stored in the data store 912 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing the example of FIG. 9, the processor 902 can be one or more programmable processors to execute one or more executable instructions, such as a computer program specified by the code 910, to control the operations of the computing device 900. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 904) and executed by the circuitry. In some examples, the processor 902 is a digital processor, but the processor 902 can be analog, digital, or mixed. As such, the processor 902 can execute the function, operation, or sequence of operations using digital values and/or using analog signals. In some examples, the processor 902 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 902 that are multicore can provide functionality for parallel, simultaneous execution of instructions or for parallel, simultaneous execution of one instruction on more than one piece of data.

Continuing with the example of FIG. 9, prior to execution of the code 910 the processor 902 can copy the code 910 from the non-volatile memory 908 to the volatile memory 904. In some examples, the volatile memory 904 includes one or more static or dynamic random access memory (RAM) chips and/or cache memory (e.g. memory disposed on a silicon die of the processor 902). Volatile memory 904 can offer a faster response time than a main memory, such as the non-volatile memory 908.

Through execution of the code 910, the processor 902 can control operation of the interfaces 906. The interfaces 906 can include network interfaces, such as the network interface 204, 304, 404, for example. These network interfaces can include one or more physical interfaces (e.g., a radio, an ethernet port, a USB port, etc.) and a software stack including drivers and/or other code 910 that is configured to communicate with the one or more physical interfaces to support one or more LAN, PAN, and/or WAN standard communication protocols. The communication protocols can include, for example, TCP and UDP among others. As such, the network interfaces enable the computing device 900 to access and communicate with other computing devices via a computer network.

The interfaces 906 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 910 that is configured to communicate with the user input and/or output devices. As such, the user interfaces enable the computing device 900 to interact with users to receive input and/or render output. This rendered output can include, for instance, one or more GUIs including one or more controls configured to display output and/or receive input. The input can specify values to be stored in the data store 912. The output can indicate values stored in the data store 912.

Continuing with the example of FIG. 9, the various aspects of the computing device 900 described above can communicate with one another via the interconnection mechanism 914. In some examples, the interconnection mechanism 914 includes a communications bus.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and aspects discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

Descriptions of additional examples follow. Other variations will be apparent in light of this disclosure.

Example 1 provides a method comprising: turning off one or more infrared light emitters of a device; illuminating a scene with a light source of the device other than the one or more infrared light emitters, the light source simultaneously emitting light in both visible and infrared regions of the electromagnetic spectrum; and acquiring an image of the scene in response to detection, by an infrared image sensor of the device, of light from the light source reflected by an object in the scene.

Example 2 provides a method comprising: turning off one or more infrared light emitters of a device; illuminating a scene with a light source of the device other than the one or more infrared emitters, the light source emitting light having a range of wavelengths that extends over the visible spectrum into a region of the infrared spectrum adjacent to the visible spectrum; and acquiring an image of the scene in response to detection, by an infrared image sensor of the device, of light from the light source reflected by an object in the scene.

Example 3 provides a method comprising: turning off one or more infrared light emitters of a device; illuminating a scene with a light source of the device, the light source emitting light over a range of wavelengths that includes at least a portion of the visible spectrum and at least a portion of a transition band between the visible spectrum and the infrared spectrum; and acquiring, with an infrared image sensor of the device, an image of the scene in response to detection of light in the transition band emitted by the light source and reflected by an object in the scene.

Example 4 includes the method of any one of Examples 1-3, wherein the light source emits in a near infrared portion of the infrared region of the electromagnetic spectrum.

Example 5 includes the method of any one of Examples 1-4, further comprising activating the light source and/or the image sensor in response to detecting motion in the scene.

Example 6 includes the method of Example 5, further comprising detecting the motion with a passive infrared sensor or by detecting changes in radio frequency patterns (e.g., using WI-FI or radar-based sensing).

Example 7 includes the method of any one of Examples 1-6, further comprising: prior to turning off the one or more infrared emitters, acquiring with the infrared image sensor one or more images of the scene in response to detection, by the infrared image sensor, of infrared emissions from the one or more infrared emitters reflected by the object in the scene.

Example 8 includes the method of any one of Examples 1-7, further comprising detecting a trigger to change an imaging mode of the device; wherein turning of the one or more infrared emitters and illuminating the scene with the light source are performed in response to detecting the trigger.

Example 9 includes the method of Example 8, further comprising transmitting the image (and optionally metadata associated with the image) from the device to a remote device; wherein detecting the trigger comprises receiving an instruction from the remote device to activate the light source.

Example 10 is the device configured to implement the method of any one of Examples 1-9.

Example 11 provides a method comprising: illuminating a scene with a light source configured to emit light over a first range of wavelengths having a first peak wavelength; acquiring an image of the scene, responsive to the light emitted by the light source, with an image sensor sensitive to light over a second range of wavelengths having a second peak wavelength that is offset from the first peak wavelength, the second range of wavelengths partially overlapping the first range of wavelengths.

Example 12 includes the method of Example 11, wherein illuminating the scene comprises illuminating the scene with a visible-band light emitting diode (LED) configured to emit the light over at least a portion of the visible spectrum; and wherein acquiring the image comprises acquiring the image with an infrared image sensor.

Example 13 includes the method of Example 12, wherein the second range of wavelengths comprises the near-infrared spectral band and a portion of visible spectrum adjacent to the near-infrared spectral band.

Example 14 includes the method of Example 12, wherein the second range of wavelengths comprises the near-infrared spectral band, and wherein the first range of wavelengths comprises the portion of the visible spectrum and a portion of the near-infrared spectral band adjacent to the portion of the visible spectrum.

Example 15 provides a method comprising: detecting motion with a motion detector; activating, responsive to detecting the motion, an image sensor assembly in a first mode, the image sensor assembly comprising an image sensor and a plurality of light sources, wherein activating the image sensor assembly in the first mode comprises activating the image sensor and activating a first light source of the plurality of light sources; detecting a trigger to change a mode of the image sensor assembly; changing, responsive to detecting the trigger, the mode of the image sensor assembly from the first mode to a second mode, wherein changing the mode of the image sensor assembly to the second mode includes activating a second light source of the plurality of light sources, the second light source configured to emit light in a spectral band different from a spectral band in which the first light source emits light; and acquiring, with the image sensor, one or more images responsive to the light emitted by the second light source.

Example 16 includes the method of Example 15, further comprising: prior to detecting the trigger, acquiring, with the image sensor, one or more images responsive to light emitted by the first light source.

Example 17 includes the method of one of Examples 15 or 16, wherein the image sensor is an infrared image sensor, and wherein activating the second light source comprises emitting, with the second light source, light having a range of wavelengths spanning at least a portion of the visible spectrum.

Example 18 includes the method of Example 17, wherein emitting the light with the second light source comprises emitting the light having the range of wavelengths that extends from a red region of the visible spectrum into a blue region of the visible spectrum.

Example 19 includes the method of Example 17, wherein emitting the light with the second light source comprises emitting the light having the range of wavelengths extending from a near-infrared region of the electromagnetic spectrum into a blue region of the visible spectrum.

Example 20 includes the method of any one of Examples 17-19, wherein activating the first light source comprises emitting, with the first light source, light having a range of wavelengths including a near-infrared region of the electromagnetic spectrum.

Example 21 includes the method of any one of Examples 15-20, wherein changing the mode of the image sensor assembly to the second mode includes deactivating the first light source.

Example 22 includes the method of any one of Examples 15-21, wherein detecting the motion comprises detecting the motion with a passive infrared sensor.

Example 23 includes the method of any one of Examples 15-21, wherein detecting the motion comprises detection changes in monitored radio frequency patterns.

Example 24 includes the method of any one of Examples 15-23, wherein detecting the trigger comprises receiving an instruction from a remote device to change the mode of the image sensor assembly.

Example 25 includes the method of Example 24, wherein receiving the instruction comprises receiving an instruction to activate the second light source.

Example 26 provides an image capture device comprising: the image sensor assembly, the motion detector, at least one processor; and at least one computer-readable storage medium storing instructions that, when executed by the at least one processor, configure the image capture device to perform the method of any one of Examples 15-25.

Example 27 provides a method of operating a security camera that comprises a plurality of light sources and an image sensor. The method comprises: activating, responsive to an event, the image sensor and a first light source of the plurality of light sources, the image sensor being sensitive to light over a range of wavelengths that includes a primary sensitivity region and an extended sensitivity region, and the first light source configured to emit light in a first spectral band corresponding to the primary sensitivity region of the image sensor; activating, responsive to a trigger, a second light source of the plurality of lights sources, the second light source configured to emit light in a second spectral band offset from the primary sensitivity region of the image sensor and at least partially overlapping with the extended sensitivity region of the image sensor; deactivating, responsive to the trigger, the first light source; and acquiring, with the image sensor, one or more images responsive to the light emitted by the second light source.

Example 28 includes the method of Example 27, further comprising detecting motion with a motion detector; wherein activating, responsive to the event, the image sensor and the first light source comprises activating the image sensor and the first light source responsive to detecting the motion.

Example 29 includes the method of one of Examples 27 or 28, further comprising detecting an instruction to change light sources; wherein activating, responsive to the trigger, the second light source comprises activating the second light source responsive to the instruction.

Example 30 includes the method of any one of Examples 26-29, wherein the image sensor is an infrared image sensor, the method comprising emitting, with the second light source, light in at least a portion of the visible spectrum.

Example 31 includes the method of any one of Examples 26-30, further comprising: prior to deactivating the first light source, acquiring, with the image sensor, one or more images responsive to the light emitted by the first light source.

Example 32 provides an image capture device operable in a plurality of modes and comprising: an image sensor sensitive to light in a first range of wavelengths; a first light source configured to emit light in the first range of wavelengths; a second light source configured to emit light in a second range of wavelengths that partially overlaps the first range of wavelengths; and at least one processor. The image capture device further comprises a non-transitory data storage device storing instructions that, when executed by the at least one processor, control the image capture device to: operate in a first mode in which the first light sources emits the light in the first range of wavelengths and the image sensor acquires images responsive to the light emitted by the first light source; activate a second light source and deactivate the first light source; and operate in a second mode in which the second light source emits the light in the second range of wavelengths and the image sensor acquires images responsive to the light emitted by the second light source.

Example 33 includes the image capture device of Example 32, wherein the data storage device further stores instructions that, when executed by the at least one processor, control the image capture device to: detect a trigger to change an operating mode of the image capture device; and responsive to the trigger, activate the second light source and deactivate the first light source.

Example 34 includes the image capture device of Example 33, further comprising a communication interface configured to detect a signal from a remote device, the signal containing the trigger.

Example 35 includes the image capture device of any one of Examples 31-34, wherein the image sensor is an infrared image sensor; wherein the first light source is an infrared light emitting diode (LED) and the first range of wavelengths includes a near-infrared spectral range; and wherein the second light source is a visible-band LED and the second range of wavelengths includes a visible-band spectral range.

Example 36 includes the image capture device of Example 35, wherein the first range of wavelengths includes the near-infrared spectral range and a portion of the visible-band spectral range adjacent to the near-infrared spectral range.

Example 37 includes the image capture device of Example 35, wherein the second range of wavelengths includes the visible-band spectral range and a portion of the near-infrared spectral range adjacent to the visible-band spectral range.

Example 38 includes the image capture device of any one of Examples 31-37, further comprising a passive infrared (PIR) sensor.

Example 39 includes the image capture device of Example 38, wherein the data storage device further stores instructions that, when executed by the at least one processor, control the image capture device to: detect motion with the PIR sensor; and responsive to detecting the motion, activate the image sensor and the first light source to operate the image capture device in the first mode.

Example 40 provides an image capture device operable in a plurality of modes and comprising: an image sensor sensitive to light in a first range of wavelengths; a first light source configured to emit light in the first range of wavelengths; a second light source configured to emit light in a second range of wavelengths that partially overlaps the first range of wavelengths; and means for controlling the image capture device to: operate in a first mode in which the first light sources emits the light in the first range of wavelengths and the image sensor acquires images responsive to the light emitted by the first light source; activate a second light source and deactivate the first light source; and operate in a second mode in which the second light source emits the light in the second range of wavelengths and the image sensor acquires images responsive to the light emitted by the second light source.

Example 41 provides an image capture device comprising: one or more infrared light emitters, a light source configurable to emit light over a range of wavelengths that includes at least a portion of the visible spectrum; an infrared image sensor; and means for operating the image capture device to control the infrared image sensor to acquire images in response to detection of the light reflected from objects in a field of view of the infrared image sensor.

As will be appreciated in light of this disclosure, modifications are possible in the described embodiments, and other embodiments are possible, within the scope of the claims.

The invention claimed is:

1. A method comprising:
turning off one or more infrared light emitters of a device;
illuminating a scene with a light source of the device without any of the one or more infrared light emitters, the light source simultaneously emitting light in both visible and infrared regions of the electromagnetic spectrum; and
acquiring an image of the scene in response to detection, by an infrared image sensor of the device, of light from the light source reflected by an object in the scene.

2. The method of claim 1, wherein the light source emits in a near infrared portion of the infrared region of the electromagnetic spectrum.

3. The method of claim 1, further comprising:
activating the light source and/or the image sensor in response to detecting motion in the scene.

4. The method of claim 3, further comprising:
detecting the motion with a passive infrared sensor.

5. The method of claim 1, further comprising:
prior to turning off the one or more infrared emitters, acquiring with the infrared image sensor one or more images of the scene in response to detection, by the infrared image sensor, of infrared emissions from the one or more infrared emitters reflected by the object in the scene.

6. The method of claim 1, further comprising:
detecting a trigger to change an imaging mode of the device;
wherein turning off the one or more infrared emitters and illuminating the scene with the light source are performed in response to detecting the trigger.

7. The method of claim 6, further comprising:
transmitting the image from the device to a remote device;
wherein detecting the trigger comprises receiving an instruction from the remote device to activate the light source.

8. A method comprising:
turning off one or more infrared light emitters of a device;
illuminating a scene with a light source of the device without any of the one or more infrared emitters, the light source emitting light having a range of wavelengths that extends over the visible spectrum into a region of the infrared spectrum adjacent to the visible spectrum; and
acquiring an image of the scene in response to detection, by an infrared image sensor of the device, of light from the light source reflected by an object in the scene.

9. The method of claim 8, wherein the light source emits in a near infrared portion of the infrared region of the electromagnetic spectrum.

10. The method of claim 8, further comprising:
activating the light source and/or the image sensor in response to detecting motion in the scene.

11. The method of claim 10, further comprising:
detecting the motion with a passive infrared sensor.

12. The method of claim 8, further comprising:
prior to turning off the one or more infrared emitters, acquiring with the infrared image sensor one or more images of the scene in response to detection, by the infrared image sensor, of infrared emissions from the one or more infrared emitters reflected by the object in the scene.

13. The method of claim 8, further comprising:
detecting a trigger to change an imaging mode of the device;
wherein turning off the one or more infrared emitters and illuminating the scene with the light source are performed in response to detecting the trigger.

14. The method of claim 13, further comprising:
transmitting the image from the device to a remote device;
wherein detecting the trigger comprises receiving an instruction from the remote device to activate the light source.

15. A method comprising:
turning off one or more infrared light emitters of a device;
illuminating a scene with a light source of the device, not including any of the one or more infrared light emitters, the light source emitting light over a range of wavelengths that includes at least a portion of the visible spectrum and at least a portion of a transition band between the visible spectrum and the infrared spectrum; and
acquiring, with an infrared image sensor of the device, an image of the scene in response to detection of light in the transition band emitted by the light source and reflected by an object in the scene.

16. The method of claim 15, wherein the light source emits in a near infrared portion of the infrared region of the electromagnetic spectrum.

17. The method of claim 15, further comprising:
activating the light source and/or the image sensor in response to detecting, with a passive infrared sensor, motion in the scene.

18. The method of claim 15, further comprising:
prior to turning off the one or more infrared emitters, acquiring with the infrared image sensor one or more images of the scene in response to detection, by the infrared image sensor, of infrared emissions from the one or more infrared emitters reflected by the object in the scene.

19. The method of claim 15, further comprising:
detecting a trigger to change an imaging mode of the device;
wherein turning off the one or more infrared emitters and illuminating the scene with the light source are performed in response to detecting the trigger.

20. The method of claim 19, further comprising:
transmitting the image from the device to a remote device;

wherein detecting the trigger comprises receiving an instruction from the remote device to activate the light source.

\* \* \* \* \*